United States Patent
Chang et al.

(10) Patent No.: US 9,831,529 B2
(45) Date of Patent: Nov. 28, 2017

(54) LITHIUM METAL BATTERY

(71) Applicant: Samsung Electronics Co., Ltd., Suwon-si, Gyeonggi-do (KR)

(72) Inventors: Wonseok Chang, Seoul (KR);
Tomonobu Mizumo, Yokohama (JP);
Toshinori Sugimoto, Hwaseong-si (KR); Hyorang Kang, Anyang-si (KR);
Joungwon Park, Yongin-si (KR);
Yonggun Lee, Incheon (KR); Hongsoo Choi, Seoul (KR); Hosang Park, Seoul (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 0 days.

(21) Appl. No.: 15/047,187

(22) Filed: Feb. 18, 2016

(65) Prior Publication Data
US 2016/0344063 A1    Nov. 24, 2016

(30) Foreign Application Priority Data
May 20, 2015 (KR) .................. 10-2015-0070563

(51) Int. Cl.
*H01M 10/05* (2010.01)
*H01M 10/0569* (2010.01)
(Continued)

(52) U.S. Cl.
CPC ..... *H01M 10/0569* (2013.01); *H01M 2/1653* (2013.01); *H01M 4/131* (2013.01);
(Continued)

(58) Field of Classification Search
CPC .................................................. H01M 10/05
See application file for complete search history.

(56) References Cited

U.S. PATENT DOCUMENTS

| | | | |
|---|---|---|---|
| 6,210,835 B1 | 4/2001 | Arai | |
| 2013/0108932 A1* | 5/2013 | Onozaki | H01M 10/0525 429/338 |

(Continued)

FOREIGN PATENT DOCUMENTS

| | | |
|---|---|---|
| CN | 103972587 A | 8/2014 |
| EP | 2469633 A1 | 6/2012 |

(Continued)

OTHER PUBLICATIONS

Naoi et al., "Nonflammable Hydrofluoroether for Lithium-Ion Batteries: Enhanced Rate Capability, Cyclability, and Low-Temperature Performance", Journal of The Electrochemical Society, 156(4), 2009, A272-276.

(Continued)

*Primary Examiner* — Jacob Marks
(74) *Attorney, Agent, or Firm* — Cantor Colburn LLP

(57) ABSTRACT

A lithium metal battery including: a lithium negative electrode including lithium metal; a positive electrode; and an electrolyte interposed between the lithium negative electrode and the positive electrode, wherein the electrolyte contains non-fluorine substituted ether, which is capable of solvating lithium ions, a fluorine substituted ether represented by the following Formula 1, and a lithium salt, wherein an amount of the fluorine substituted ether represented by Formula 1 is greater than an amount of the non-fluorine substituted ether, $$R-\{O(CH_2)_a\}_b-CH_2-O-C_nF_{2n}H \qquad \text{Formula 1}$$

wherein R is $-C_mF_{2m}H$ or $-C_mF_{2m+1}$, n is an integer of 2 or greater, m is an integer of 1 or greater, a is an integer of 1 or 2, and b is 0 or 1.

23 Claims, 21 Drawing Sheets

(51) Int. Cl.
| | |
|---|---|
| *H01M 10/0525* | (2010.01) |
| *H01M 10/0568* | (2010.01) |
| *H01M 4/131* | (2010.01) |
| *H01M 4/134* | (2010.01) |
| *H01M 4/525* | (2010.01) |
| *H01M 4/38* | (2006.01) |
| *H01M 4/62* | (2006.01) |
| *H01M 4/66* | (2006.01) |
| *H01M 2/16* | (2006.01) |
| *H01M 10/0585* | (2010.01) |
| *H01M 10/052* | (2010.01) |
| *H01M 4/02* | (2006.01) |
| *H01M 4/1391* | (2010.01) |
| *H01M 4/04* | (2006.01) |

(52) U.S. Cl.
CPC ........... *H01M 4/134* (2013.01); *H01M 4/382* (2013.01); *H01M 4/525* (2013.01); *H01M 4/623* (2013.01); *H01M 4/625* (2013.01); *H01M 4/661* (2013.01); *H01M 10/052* (2013.01); *H01M 10/0525* (2013.01); *H01M 10/0568* (2013.01); *H01M 10/0585* (2013.01); *H01M 4/0404* (2013.01); *H01M 4/0471* (2013.01); *H01M 4/1391* (2013.01); *H01M 2004/027* (2013.01); *H01M 2004/028* (2013.01); *H01M 2220/30* (2013.01); *H01M 2300/004* (2013.01); *H01M 2300/0028* (2013.01); *H01M 2300/0034* (2013.01); *H01M 2300/0037* (2013.01); *Y02T 10/7011* (2013.01)

(56) References Cited

U.S. PATENT DOCUMENTS

2013/0337338 A1  12/2013  Tikhonov et al.
2015/0249269 A1   9/2015  Yoon et al.

FOREIGN PATENT DOCUMENTS

| JP | 2008-218387 A | 9/2008 |
| JP | 2013-211095 A | 10/2013 |
| KR | 1020140066645 A | 6/2014 |
| WO | 2012/011507 A1 | 1/2012 |
| WO | 2015046174 A1 | 4/2015 |

OTHER PUBLICATIONS

Zhang et al., "Fluorinated electrolytes for 5 V lithium-ion battery chemistry+", Energy & Environmental Science, vol. 6, 2013, pp. 1806-1810.

Extended European Search Report for Application No. 16158520.3-1360 dated Dec. 21, 2016 (7 pages).

Azmi et al., "Improved performance of lithium-sulfur battery with fuluorinated electrolyte", Electrochemistry Communications, 37, 2013, pp. 96-99.

\* cited by examiner

LITHIUM METAL BATTERY

CROSS-REFERENCE TO RELATED APPLICATION

This application claims priority to and the benefit of Korean Patent Application No. 10-2015-0070563, filed on May 20, 2015, in the Korean Intellectual Property Office, the disclosure of which is incorporated herein in its entirety by reference.

BACKGROUND

1. Field

The present disclosure relates to a lithium metal battery employing a lithium negative electrode.

2. Description of the Related Art

As the electrical, electronic, telecommunication, and computer industries have rapidly developed, demand for secondary batteries having improved performance and improved safety have recently rapidly increased. Particularly, along with the trends of reducing the weight, thickness, length, and size of electrical and electronic products and improving their portability, secondary batteries that are core components are also desirably light and compact. Further, as environmental pollution problems have become significant, such as air pollution and noise pollution from the distribution of automobiles in large numbers, the challenge of providing environmentally less impactful energy supply sources has come to the fore, as well as the desire to develop electric vehicles that are capable of solving such problems, including the development of batteries having improved power output and improved energy density which can serve as improved electric vehicle power sources. Lithium metal batteries have received significant attention as a next generation advanced new battery, which can provide improved performance. Lithium, which can be used as a negative electrode material, is very low in density and standard reduction potential. Therefore lithium has attractive characteristics as an electrode material for high energy density batteries. Nonetheless, improved materials are needed to provide a more practical lithium battery.

SUMMARY

Provided is a lithium metal battery having a lithium negative electrode.

Provided is an electrolyte for a lithium metal battery, which provides improved flame retardancy and stability.

Additional aspects will be set forth in part in the description which follows and, in part, will be apparent from the description.

According to an aspect, a lithium metal battery includes: a lithium negative electrode including lithium metal; a positive electrode; and an electrolyte interposed between the lithium negative electrode and the positive electrode, wherein the electrolyte contains a non-fluorine substituted ether, which is capable of solvating lithium ions, a fluorine substituted ether represented by Formula 1, and a lithium salt, wherein an amount of the fluorine substituted ether represented by Formula 1 is greater than an amount of the non-fluorine substituted ether,

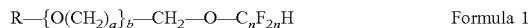

Formula 1 wherein R is $-C_mF_{2m}H$ or $-C_mF_{2m+1}$, n is an integer of 2 or greater, m is an integer of 1 or greater, a is an integer of 1 or 2, and b is 0 or 1.

According to an aspect, an electrolyte for a lithium metal battery contains a non-fluorine substituted ether, which is capable of solvating lithium ions, a fluorine substituted ether represented by Formula 1, and a lithium salt, wherein an amount of the fluorine substituted ether represented by Formula 1 is greater than an amount of the non-fluorine substituted ether.

Also disclosed is lithium metal battery, which includes the disclosed electrolyte, provides improved lifetime characteristics and improved voltage stability.

Also a method of manufacturing an electrolyte, the method including: contacting a non-fluorine substituted ether, which is capable of solvating lithium ions, a fluorine substituted ether represented by Formula 1, and a lithium salt, to manufacture the electrolyte, wherein the amount of the fluorine substituted ether represented by Formula 1 is greater than an amount of the non-fluorine substituted ether,

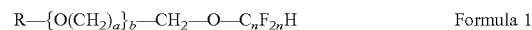

Formula 1 wherein R is $-C_mF_{2m}H$ or $-C_mF_{2m+1}$, n is an integer of 2 or greater, m is an integer of 1 or greater, a is an integer of 1 or 2, and b is 0 or 1

BRIEF DESCRIPTION OF THE DRAWINGS

These and/or other aspects will become apparent and more readily appreciated from the following description of the exemplary embodiments, taken in conjunction with the accompanying drawings in which.

DETAILED DESCRIPTION

Figure 1:
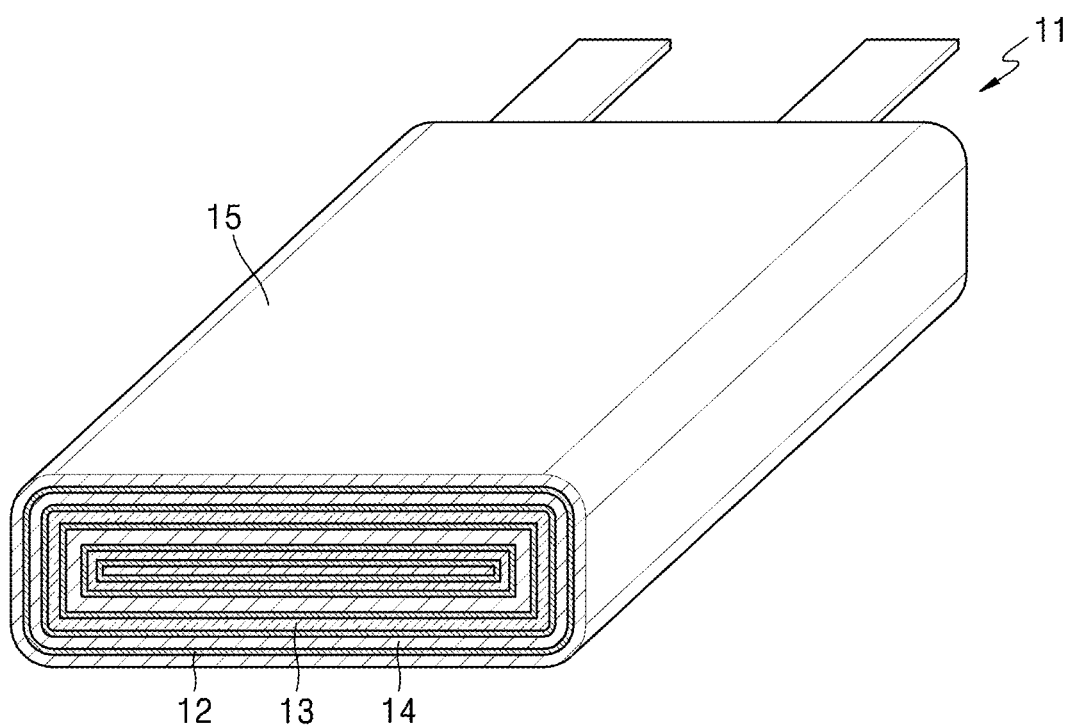
FIG. 1 is a schematic diagram of an embodiment of a lithium metal battery.

Reference will now be made in detail to exemplary embodiments, examples of which are illustrated in the accompanying drawings, wherein like reference numerals refer to like elements throughout. In this regard, the present exemplary embodiments may have different forms and should not be construed as being limited to the descriptions set forth herein. Accordingly, the exemplary embodiments are merely described below, by referring to the figures, to explain aspects. As used herein, the term "and/or" includes any and all combinations of one or more of the associated listed items. "Or" means "and/or." Expressions such as "at least one of," when preceding a list of elements, modify the entire list of elements and do not modify the individual elements of the list.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third," etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, an electrolyte for a lithium metal battery and a lithium metal battery including the electrolyte are described in more detail.

A lithium metal battery according to an embodiment includes a lithium negative electrode, a positive electrode, and an electrolyte, wherein the electrolyte includes i) a non-fluorine substituted ether which has a high dissolution capability for lithium ions, ii) a fluorine substituted ether-based solvent represented by Formula 1, and iii) a lithium salt, wherein the amount of the fluorine substituted ether-based solvent represented by Formula 1 is greater than that of the non-fluorine substituted ether-based solvent in which lithium ions are soluble:

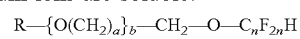

Formula 1 wherein R is —$C_mF_{2m}H$ or —$C_mF_{2m+1}$, n is an integer of 2 or greater, m is an integer of 1 or greater, a is an integer of 1 or 2, and b is 0 or 1. While not wanting to be bound by theory, it is understood that lithium ions are dissolved in the non-fluorine substituted ether and are effectively not present in the fluorine substituted ether. The disclosed combination of ethers provides an electrolyte having improved properties, resulting in improved lithium metal battery performance.

If an amount of the fluorine substituted ether-based solvent represented by Formula 1 is less than or the same as that of the non-fluorine substituted ether-based solvent in which lithium ions are soluble, it may be difficult to obtain a suitable electrolyte having suitable high voltage stability and flame retardancy, or it may be difficult to obtain suitable ion conductivity due to the electrolyte having too high of a viscosity, for example.

The non-fluorine substituted ether-based solvent in which lithium ions are solvated has solubility characteristics such that it can dissolve a lithium salt to a high concentration, and form an ion conduction activation domain in the electrolyte. By using the non-fluorine substituted ether-based solvent, oxidation resistance of the electrolyte may be improved, and high-rate charge/discharge characteristics of lithium metal batteries employing the electrolyte may be improved.

While not wanting to be bound by theory, it is understood that the fluorine substituted ether-based solvent forms an ion conduction inactivation domain in the electrolyte, and that the fluorine substituted ether has a very low solubility or effectively no solubility for a lithium salt. If the electrolyte contains the fluorine substituted ether-based solvent, an overall viscosity of the electrolyte may be reduced, and oxidation of an ion conduction activation domain in an interface of the electrolyte and lithium metal may be effectively prevented. Further, the fluorine substituted ether-based solvent may provide improved flame retardancy such that the non-fluorine substituted ether-based solvent, which is relatively vulnerable to ignition, may become stabilized to a higher temperature by blocking a reaction of the electrolyte with active oxygen.

The fluorine substituted ether-based solvent may include —$CH_2$—O— units in addition to —$C_nF_{2n}H$ units in the molecule, and the —$CH_2$—O— units may have oxygen with unshared electron pairs, and the oxygen may form a coordination bond with lithium. This structure is understood to provide for improved diffusion of lithium such that ion conductivity may be improved. The fluorine substituted ether-based solvent having a —$CF_2$—O— unit instead of a —$CH_2$—O— unit beside the —$C_nF_{2n}H$ unit is understood to make diffusion of lithium more difficult compared to compounds of Formula 1 having the —$CH_2$—O— unit due to an electron accepting —$CF_2$— group in which unshared electron pairs of oxygen are adjacent to each other.

The non-fluorine substituted ether-based solvent in which lithium ions are solvated may be contained in an amount of about 15% by volume to about 45% by volume, e.g., about 20% by volume to about 40% by volume, or about 25% by volume to about 35% by volume, based on the total volume of the non-fluorine substituted ether-based solvent and the fluorine substituted ether-based solvent. When the non-fluorine substituted ether-based solvent is contained in the range, the electrolyte may have improved ion conductivity.

The fluorine substituted ether-based solvent may be contained in an amount of about 55% by volume to about 85% by volume, e.g., about 60% by volume to about 85% by volume, or about 65% by volume to about 80% by volume, based on the total volume of the non-fluorine substituted ether-based solvent and the fluorine substituted ether-based solvent. When the fluorine substituted ether-based solvent is contained in the foregoing range, the electrolyte is more easily prepared, and the electrolyte may have improved ion conductivity without deteriorating oxidation resistance or flame retardancy of the lithium metal battery, and without the viscosity of the electrolyte becoming too high.

Although a reason for improving performance of the lithium metal battery by adding the non-fluorine substituted ether-based solvent in which lithium ions are solvated and the fluorine substituted ether-based solvent represented by Formula 1 in an electrolyte may be described hereinafter more specifically, the reason is not limited to the following theory.

If a graphite negative electrode is used as a negative electrode for a lithium metal battery, interfacial characteristics of the negative electrode are not significantly changed when a solid electrolyte interphase (SEI) layer is formed on a surface of the negative electrode. If the a lithium salt is solvated by the solvent, the solvated lithium salt has an enlarged structure and the enlarged structure can result in a structural collapse of graphite or other soft carbons having an interlayer structure, or a formation of a byproduct on the SEI surface of a graphite electrode.

On the contrary, interfacial characteristics of a lithium metal negative electrode are changed since new interfaces are continually formed on surfaces of the lithium metal negative electrodes during charge and discharge of lithium negative electrodes in lithium metal batteries due to lithium deposition and stripping. Thus the graphite electrodes are understood to consistently exhibit stable phenomena if an SEI is formed on the graphite electrode. However, a lithium negative electrode may be damaged when the lithium negative electrode passes through a discharging process in which lithium metal ions are separated from the lithium negative electrode although a SEI has been formed on the lithium negative electrode. While not wanting to be bound by theory, it is understood that the lithium metal electrode may be damaged because the lithium metal negative electrode is not an ion intercalation/deintercalation type electrode but has a mechanism of deposition and stripping of lithium ions on the negative electrode surfaces. If such a process is consistently repeated, depletion of the electrolyte can occur such that lifetime characteristics of batteries may deteriorate.

However, it is understood that if an electrolyte according to an embodiment is used, amounts of a lithium salt are greater such that improvement in ion conduction characteristics (improvement in high-rate characteristics) according to concentration gradient minimization occurring during charge is induced, and opportunities of bringing solvent molecules into contact with Li metal negative electrodes are relatively reduced such that a byproduct layer formed from the SEI and reduced substances of electrolytes is minimized. Therefore, the disclosed lithium metal battery can provide improved density characteristics without forming byproducts on the surfaces of the lithium negative electrodes, which is distinct from the case of the graphite electrode. If the disclosed lithium metal battery contains the lithium salt in an amount of about 2.5 molar (M) to about 7 M, about 3 M to about 6 M, about 3.5 M to about 5 M, or about 4 M, reduction of a solvent can occur during charge to prevent in advance the formation of the SEI on the surfaces of the lithium negative electrode.

The fluorine substituted ether-based solvent represented by Formula 1 is understood to influence flame retardancy and oxidation resistance of electrolyte. While not wanting to be bound by theory, it is understood that the fluorine substituted ether-based solvent, when added in the electrolyte, results in a porous thin film-shaped SEI which is formed on the surfaces of the negative electrode. It is believed that the SEI suppresses additional reduction reactions of the electrolyte, effectively preventing oxidation of the electrolyte at an interface with the lithium negative electrode, thereby improving flame retardancy of the electrolyte, and lowering the viscosity of the electrolyte to about 5 centipoise (cP) or less, e.g., about 0.01 cP to about 4 cP, or about 0.05 cP to about 3 cP, or about 0.1 cP to about 2 cP, even at high concentration values of the lithium salt. The fluorine substituted ether-based solvent of Formula 1 is understood to minimize oxidation of the electrolyte at the positive electrode side, lower the viscosity of the electrolyte, effectively impart flame retardancy to the electrolyte, and to greatly influence electrolyte viscosity. When the disclosed electrolyte is used, flame retardancy and safety, e.g., high voltage safety of a battery is improved, and a battery having high energy density characteristics without forming undesirable decomposition products of the electrolyte on an interface between the lithium negative electrode and the electrolyte is provided.

Further, the non-fluorine substituted ether-based solvent in which lithium ions are solvated may dissolve a lithium salt at a high concentration, e.g., at least about 2.5 molar (M) to about 7 M, about 3 M to about 6 M, about 3.5 M to about 5 M, or about 4 M.

Therefore, the lithium metal battery using the electrolyte including the non-fluorine substituted ether-based solvent has not only improved ion conductivity but also very improved oxidation resistance and high-rate charge/discharge characteristics by dissolving the lithium salt at a greater concentration than would otherwise be possible.

Since the fluorine substituted ether-based solvent represented by Formula 1 has an electron withdrawing group, it is strongly resistant to oxidation. Therefore, the fluorine substituted ether-based solvent represented by Formula 1 may prevent oxidation of the electrolyte that may occur from the positive electrode side at high voltages, for example as may be present during charge.

Resultingly, the fluorine substituted ether-based solvent represented by Formula 1 may form an SEI layer on a surface of the negative electrode, and the fluorine substituted ether-based solvent represented by Formula 1 has an improved stability such that lifetime characteristics, high-rate charge/discharge characteristics, and safety of lithium metal batteries may be improved, in particular at high voltage.

According to another aspect, an electrolyte for the lithium metal battery comprises i) a non-fluorine substituted ether-based solvent having a high dissolution capability for lithium ions, ii) a fluorine substituted ether-based solvent represented by Formula 1, and iii) a lithium salt, wherein the amount of the fluorine substituted ether-based solvent represented by Formula 1 is greater than that of the non-fluorine substituted ether-based solvent in which lithium ions are solvated:

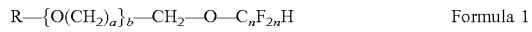    Formula 1 wherein R is $-C_mF_{2m}H$ or $-C_mF_{2m+1}$, n is an integer of 2 or greater, m is an integer of 1 or greater, a is an integer of 1 or 2, and b is 0 or 1.

The fluorine substituted ether-based solvent represented by Formula 1 is contained in an amount ranging from about 55% by volume to about 85% by volume, and the high dissolution capability ether-based solvent in which lithium ions are solvated is contained in an amount ranging from about 15% by volume to about 45% by volume.

Electrolytes according to embodiments are useful as electrolytes of lithium metal batteries employing lithium negative electrodes for high energy density enabling high-rate charge/discharge at high voltages.

In Formula 1, n may be an integer of 2 to 5, and m may be an integer of 1 to 5.

In Formula 1, R may be $-CF_2CF_2H$, $-CF_2CF_2CF_2H$, $-CF_2CF_2CF_2CF_2H$, or $-CF_3$, and $-C_nF_{2n}H$ may be $-CF_2CF_2H$, $-CF_2CF_2CF_2H$, or $-CF_2CF_2CF_2CF_2H$.

The fluorine substituted ether-based solvent may comprise a compound represented by Formula 2:

    Formula 2 wherein R is $-C_{m+1}H_mF_{2m}$ or $-C_mF_{2m+1}$, n is an integer of 2 to 5, and m is an integer of 1 to 5.

The fluorine substituted ether-based solvent represented by Formula 2 maybe one or more selected from $HCF_2CF_2CH_2OCF_2CF_2H$, $HCF_2CF_2CH_2OCF_2CF_2CF_2H$, $HCF_2CF_2OCH_2CF_3$, $HCF_2CF_2OCH_2CH_2OCF_2CF_2H$, $HCF_2CF_2OCH_2CH_2OCF_2CF_2H$, $HCF_2CF_2OCH_2CH_2CH_2OCF_2CF_2H$, $HCF_2CF_2CH_2OCF_2CF_2CF_2H$, $HCF_2CF_2OCH_2CH_2OCF_2CF_2CF_2H$, and $HCF_2CF_2OCH_2CH_2CH_2OCF_2CF_2CF_2H$. Since the fluorine substituted ether-based solvent has a low polarity, a possibility that an impurity may be dissolved into the electrolyte containing the fluorine substituted ether-based solvent is reduced.

Since the fluorine substituted ether-based solvent used in the electrolyte has a flash point of about 80° C. or higher, e.g., about 80° C. to about 200° C., the electrolyte can provide improved flame retardancy, and a high temperature stability of a battery comprising the electrolyte may be improved. Further, the fluorine substituted ether-based solvent is low in polarity and has a structure in which a fluorine substituted functional group is bonded around a $-CH_2-O-$ moiety. While not wanting to be bound by theory, it is understood that the $-CH_2-O-$ moiety provides improved miscibility with the non-fluorine substituted ether-based solvent, such as dimethyl ether (DME), in which lithium ions are solvated.

The disclosed electrolyte may comprise a lithium salt in an amount ranging from about 5% by weight to about 20% by weight, about 7% by weight to about 18% by weight, or about 9% by weight to about 16% by weight, based on the total weight of the electrolyte. When the lithium salt is contained in the electrolyte in the foregoing range, effects of improving lifetime characteristics of the lithium battery are excellent without increasing the internal resistance of the electrolyte.

The lithium salt may be any suitable material for preparing the electrolyte. Representative materials for the lithium salt may include $LiSCN$, $LiN(CN)_2$, $LiClO_4$, $LiBF_4$, $LiAsF_6$, $LiPF_6$, $LiCF_3SO_3$, $Li(CF_3SO_2)_2N$, $Li(CF_3SO_2)_3C$, $LiSbF_6$, $LiN(SO_2CF_3)_2$, $Li(FSO_2)_2N$, $LiC_4F_9SO_3$, $LiN(SO_2CF_3)_2$, $LiSbF_6$, $LiPF_3(CF_2CF_3)_3$, $LiPF_3(C_2F_5)_3$, $LiPF_3(CF_3)_3$, $LiCl$, $LiF$, $LiBr$, $LiI$, $LiB(C_2O_4)_2$, lithium difluoro(oxalato)borate (LiFOB), lithium bis(oxalato)borate (Li-BOB), and mixtures thereof.

The lithium salt according to an embodiment may be fluorine-containing sulfone based compound. Examples of the fluorine-containing sulfone imide based compound may include $LiN(FSO_2)_2(LiFSI)$, $LiN(CF_3SO_2)_2(LiTFSI)$, LiN $(CF_3SO_2)(CF_3CF_2CF_2SO_2)$, $LiN(CF_3CF_2SO_2)_2$, $LiC(CF_3SO_2)_2$, and $LiC(CF_3CF_2SO_2)_2$.

The electrolyte may be in a liquid state or a gel state.

For example, the non-fluorine substituted ether-based solvent in which lithium ions are solvated may be a glyme based solvent.

The non-fluorine substituted ether-based solvent in which lithium ions are solvated may be one or more selected from ethyleneglycol dimethylether, (i.e., 1,2-dimethoxyethane), ethyleneglycol diethylether (i.e., 1,2-diethoxyethane), propyleneglycol dimethylether, propyleneglycol diethylether, butyleneglycol dimethylether, butyleneglycol diethylether, diethyleneglycol dimethylether, triethyleneglycol dimethylether, tetraethyleneglycol dimethylether, diethyleneglycol diethylether, triethyleneglycol diethylether, tetraethyleneglycol diethylether, dipropyleneglycol dimethylether, tripropyleneglycol dimethylether, tetrapropyleneglycol dimethylether, dipropyleneglycol diethylether, tripropyleneglycol diethylether, tetrapropyleneglycol diethylether, dibutyleneglycol dimethylether, tributyleneglycol dimethylether, tetrabutyleneglycol dimethylether, dibutyleneglycol diethylether, tributyleneglycol diethylether, tetrabutyleneglycol diethylether, poly(ethyleneglycol) dilaurate (PEGDL), poly(ethyleneglycol) monoacrylate (PEGMA), and poly(ethyleneglycol) diacrylate (PEGDA).

The electrolyte may have a viscosity range of about 5 cP or less, e.g., about 0.01 cP to about 4 cP, or about 0.05 cP to about 3 cP, or about 0.1 cP to about 2 cP, at 25° C. When the electrolyte has such a viscosity range, ions are moved freely within the electrolyte, and the ion conductivity of the electrolyte may be improved.

An electrolyte according to an embodiment comprises the lithium salt in an amount ranging from about 2.5 M to about 7 M and has a viscosity range of about 5 cP or less at 25° C., e.g., about 2.5 cP to about 4.0 cP. When the lithium salt is contained in the electrolyte in the foregoing range and the electrolyte has the foregoing viscosity, the electrolyte may provide improved conductivity and oxidation resistance, and a lithium metal battery with improved high voltage stability may be obtained.

The electrolyte may have an ion conductivity range of about 1.0 mS/cm or higher at 25° C., e.g., about 1 mS/cm to about 5 mS/cm.

The electrolyte may additionally include one or more selected from ethylene carbonate, propylene carbonate, dimethyl carbonate, diethyl carbonate, butylene carbonate, ethylmethyl carbonate, fluoroethylene carbonate, methylpropyl carbonate, ethylpropyl carbonate, methylisopropyl carbonate, dipropyl carbonate, dibutyl carbonate, gamma butyrolactone, dimethylene glycol dimethyl ether, trimethylene glycol dimethyl ether, tetraethylene glycol dimethyl ether, polyethylene glycol dimethyl ether, succinonitrile, dimethyl sulfone, ethylmethyl sulfone, diethyl sulfone, adiponitrile, 1,1,2,2-tetrafluoroethyl 2,2,3,3-tetrafluoropropyl ether, 2,2,3,3,4,4,5,5-octafluoropentyl-1,1,2,2-tetrafluoroethyl ether, benzonitrile, acetonitrile, tetrahydrofuran, 2-methyltetrahydrofuran, γ-butyrolactone, dioxolane, 4-methyldioxolane, N,N-dimethylformamide, N,N-dimethylacetamide, dimethyl sulfoxide, dioxane, sulfolane, dichloroethane, chlorobenzene, and nitrobenzene.

For the purpose of improving charge/discharge characteristics, flame retardancy and other properties of the electrolytes, pyridine, triethyl phosphate, triethanolamine, cyclic ether, ethylene diamine, n-glyme, hexamethyl phosphoramide, nitrobenzene derivatives, sulfur, a quinine imine dye, N-substituted oxazolidinone, N,N-substituted imidazolidine, ethylene glycol dialkyl ether, an ammonium salt, pyrrole, 2-methoxy ethanol, and aluminum trichloride may be added in the electrolyte. In some cases, the electrolyte may additionally include a halogen-containing solvent such as carbon tetrachloride and ethylene trifluoride in order to impart nonflammability to the electrolyte.

In a preferred embodiment, the electrolyte comprises i) dimethyl ether (DME), which is a non-fluorine substituted ether-based solvent having a high dissolution capability for lithium ions, ii) $HCF_2CF_2CH_2OCF_2CF_2H$ (TTE) or $HCF_2CF_2CH_2OCF_2CF_2CF_2H$ (OTE), each of which is a fluorine substituted ether-based solvent, and iii) lithium bis(fluorosulfonyl)imide (LiFSI) or lithium bis(trifluoromethane)sulfonimide (LiTFSI). Here, i) DME and ii) TTE or OTE have a mixing ratio by volume of about 40:60 (i.e., 1:1.5) to 20:80 (i.e., 1:4), about 1:1.75 to about 1:35, or about 1:2 to about 1:3. The lithium salt, LiFSI or LiTFSI, maybe contained in an amount ranging from about 4 M to about 6 M.

An organic solvent in the electrolyte may include a low boiling point solvent. The low boiling point solvent can having a boiling point range of about 200° C. or less at 25° C. and 1 atmospheric pressure.

For example, the organic solvent may include one or more selected from dialkyl carbonate, cyclic carbonate, linear or cyclic ester, linear or cyclic amide, aliphatic nitrile, linear or cyclic ether, and a derivative thereof.

For example, although examples of the organic solvent may include one or more selected from dimethyl carbonate (DMC), ethylmethyl carbonate (EMC), methyl propyl carbonate, ethyl propyl carbonate, diethyl carbonate (DEC), dipropyl carbonate, propylene carbonate (PC), ethylene carbonate (EC), fluoroethylene carbonate (FEC), butylene carbonate, ethyl propionate, ethyl butyrate, acetonitrile, succinonitrile, dimethyl sulfoxide, dimethyl formamide, dimethyl acetamide, γ-valerolactone, γ-butyrolactone, and tetrahydrofuran, the organic solvent is not limited to these examples, and any suitable organic solvent may be used if the organic solvent has a low boiling point, e.g., a boiling point of about 200° C. or less at 25° C. and 1 atmospheric pressure.

The form of the lithium metal battery is not particularly limited, and the lithium metal battery may be a lithium primary battery or a lithium secondary battery.

The lithium negative electrode can be in the form of a lithium thin film or a lithium alloy electrode.

The lithium alloy may include a metal and/or a metalloid that is alloyable with lithium. Examples of the metal and/or metalloid that is alloyable with lithium may include Si, Sn, Al, Ge, Pb, Bi, Sb, and a Si—Y' alloys (wherein Y' is an alkali metal, an alkaline earth metals, a Group 13 elements, a Group 14 elements, a transition metals, a rare earth element or combination thereof with Y' not being Si), a Sn—Y" alloys (wherein Y" is an alkali metal, an alkaline earth metals, a Group 13 elements, a Group 14 elements, a transition metals, a rare earth element or a combination thereof with Y" not being Sn). Examples of the element Y' and Y" may each independently include Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ge, P, As, Sb, Bi, S, Se, Te, Po, and a combination thereof.

The lithium metal battery has improved stability at a high voltage range of about 4.35 V or higher, e.g., about 4.4 V to about 4.5 V.

The disclosed lithium metal battery may be manufactured by forming a lithium deposition layer having a jelly bean shaped morphology to a thickness of about 10 micrometers (μm) to about 30 μm, e.g., about 20 μm, on a surface of the lithium negative electrodes after performing a charging and discharging process for 20 to 30 cycles under charge/discharge conditions of 0.5 C at about 2 V to about 4.4 V. A C rate is a measure of the rate a battery is charged or discharged relative to its maximum capacity. A 1 C rate means a current which will discharge the entire capacity in one hour. Thus, for example, for a battery with a capacity of 100 ampere-hrs, a C rate discharge would be a discharge current of 100 amperes, a 5 C rate for this battery would be 500 amperes, and a C/2 rate would be 50 amperes.

For example, the lithium metal battery may be manufactured by the following method.

First a positive electrode is prepared. For example, a positive electrode active material composition in which a positive electrode active material, a conducting agent, a binder, and a solvent are mixed is prepared. The positive electrode active material composition may be directly coated on a metal current collector to manufacture a positive electrode plate. Alternatively, after the positive electrode active material composition is cast onto a separate support, a film delaminated from the support is laminated on a metal current collector to manufacture a positive electrode plate. The positive electrode is not limited to the above listed forms, and the positive electrode may be formed in other forms in addition to the above-mentioned forms.

Any suitable material may be used without limitation, and the material for the positive electrode active material may be a lithium complex oxide.

Examples of the positive electrode active material may include at least one of complex oxides of lithium with metals selected from cobalt, manganese, nickel, and combinations thereof. For example, the positive electrode active material may be a compound represented by one of the following formulae: $Li_aAl_{1-b}B'_bD_2$ (wherein, $0.90 \leq a \leq 1.8$ and $0 \leq b \leq 0.5$); $Li_aE_{1-b}B'_bO_{2-c}D_c$ (wherein, $0.90 \leq a \leq 1.8$, $0 \leq b \leq 0.5$, and $0 \leq c \leq 0.5$); $LiE_{2-b}B'_bO_{4-c}D_c$ (wherein, $0 \leq b \leq 0.5$ and $0 \leq c \leq 0.5$); $Li_aNi_{1-b-c}Co_bB'_cD_\alpha$ (wherein, $0.90 \leq a \leq 1.8$, $0 \leq b \leq 0.5$, $0 \leq c \leq 0.05$, and $0 < \alpha \leq 2$); $Li_aNi_{1-b-c}Co_bB'_cO_{2-\alpha}F'_2$ (wherein, $0.90 \leq a \leq 1.8$, $0 \leq b \leq 0.5$, $0 \leq c \leq 0.05$, and $0 < \alpha < 2$); $Li_aNi_{1-b-c}Co_bB'_cO_{2-\alpha}F'_2$ (wherein, $0.90 \leq a \leq 1.8$, $0 \leq b \leq 0.05$, $0 \leq c \leq 0.05$, and $0 < \alpha < 2$); $Li_aNi_{1-b-c}Mn_bB'_cD_\alpha$ (wherein, $0.90 \leq a \leq 1.8$, $0 \leq b \leq 0.05$, $0 \leq c \leq 0.05$, and $0 < \alpha \leq 2$); $Li_aNi_{1-b-c}Mn_bB'_cO_{2-\alpha}F'_2$ (wherein, $0.90 \leq a \leq 1.8$, $0 \leq b \leq 0.05$, $0 \leq c \leq 0.05$, and $0 < \alpha < 2$); $Li_aNi_{1-b-c}Mn_bB'_cO_{2-\alpha}F'_2$ (wherein, $0.90 \leq a \leq 1.8$, $0 \leq b \leq 0.05$, and $0 < \alpha < 2$); $Li_aNi_bE_cG_dO_2$ (wherein, $0.90 \leq a \leq 1.8$, $0 \leq b \leq 0.5$, and $0.001 \leq d \leq 0.1$); $Li_aNi_b\text{-}Co_cMn_dG_eO_2$ (wherein, $0.90 \leq a \leq 1.8$, $0 \leq b \leq 0.9$, $0 \leq c \leq 0.5$, and $0.001 \leq e \leq 0.1$); $Li_aNiG_bO_2$ (wherein, $0.90 \leq a \leq 1.8$ and $0.001 \leq b \leq 0.1$); $Li_aCoG_bO_2$ (wherein, $0.90 \leq a \leq 1.8$ and $0.001 \leq b \leq 0.1$); $Li_aMnG_bO_2$ (wherein, $0.90 \leq a \leq 1.8$ and $0.001 \geq b \leq 0.1$); $Li_aMn_2G_bO_4$ (wherein, $0.90 \leq a \leq 1.8$ and $0.001 \leq b \leq 0.1$); $QO_2$; $QS_2$; $LiQS_2$; $V_2O_5$; $LiV_2O_5$; $LiI'O_2$; $LiNiVO_4$; $Li_{(3-f)}J_2(PO_4)_3$ (wherein, $0 \leq f \leq 2$); $Li_{(3-f)}Fe_2(PO_4)_3$ (wherein, $0 \leq f \leq 2$); and $LiFePO_4$.

In the Formulas, A is Ni, Co, Mn, or combinations thereof; B' is Al, Ni, Co, Mn, Cr, Fe, Mg, Sr, V, a rare earth element, or combinations thereof; D is O, F, S, P, or combinations thereof; E is Co, Mn, or a combination thereof; F' is F, S, P, or a combination thereof; G is Al, Cr, Mn, Fe, Mg, La, Ce, Sr, V, or a combination thereof; Q is Ti, Mo, Mn, or combinations thereof; I' is Cr, V, Fe, Sc, Y, or a combination thereof; and J is V, Cr, Mn, Co, Ni, Cu, or a combination thereof.

Coating layers formed on surfaces of the compounds, or mixtures of the compounds and compounds having coating layers may be used. The coating layers may include coating element compounds such as oxides and hydroxides of coating elements, oxyhydroxides of the coating elements, oxycarbonates of the coating elements, and hydroxy carbonates of the coating elements.

The compounds forming the coating layers may be amorphous or crystalline. Examples of the coating elements included in the coating layers may include Mg, Al, Co, K, Na, Ca, Si, Ti, V, Sn, Ge, Ga, B, As, Zr, and mixtures thereof. If a coating layer-forming process may be performed by such methods as a spray coating method, a dipping method and so on which do not adversely affect physical properties of the positive electrode active material by using such elements in the compounds, it is fine to use any coating methods. Since the coating methods are contents that may be well understood to people in the art, a detailed description of the coating method is omitted.

In order to obtain high density lithium metal batteries, it is advantageous to use high density positive electrodes. $LiCoO_2$ may be used when manufacturing the high density positive electrodes.

Examples of the conducting agent may include: carbon black; graphite particle; natural graphite; artificial graphite; acetylene black; Ketjen black; carbon fiber; carbon nanotube; metal powder, metal fiber or metal tube of copper, nickel, aluminum, and silver; and a conductive polymer such as polyphenylene derivative. However, the conducting agent is not limited to the examples, and the examples of the conducting agent may include any suitable material if the material may be used as the conducting agent in the art.

Examples of the binder may include vinylidene fluoride/hexafluoropropylene copolymers, polyvinylidene fluoride, polyimide, polyethylene, polyester, polyacrylonitrile, polymethyl methacrylate, polytetrafluoroethylene (PTFE), carboxymethyl cellulose/styrene-butadiene rubber (SMC/SBR) copolymers, styrene butadiene rubber-based polymers, and mixtures thereof. However, the binder is not limited to the examples, and the examples of the binder may include any suitable material if the materials may be used as the binder.

Examples of the solvent may include N-methylpyrrolidone (NMP), acetone, water, etc. However, the solvent is not limited to the examples, and the examples of the solvent may include any suitable material if the materials may be used as the solvent.

The positive electrode active material, conducting agent, binder, and solvent are contained in amounts that can be determined by one of skill in the art of lithium metal batteries without undue experimentation. According to uses and compositions of the lithium metal battery, at least one of the conducting agent, binder, and solvent may be omitted.

Next, a lithium metal thin film or a lithium alloy thin film as a lithium negative electrode is prepared.

Next, a separator that is interposed between the positive electrode and the lithium negative electrode is prepared.

Dielectric thin films having high ion permeability and mechanical strength are used as the separators. The separators generally have a pore diameter of about 0.01 μm to about 10 μm, and generally have a thickness of about 5 μm to about 20 μm. Examples of the separators may include sheets, non-woven fabrics, and others formed from: olefin polymers such as polypropylene; glass fibers; polyethylene; and others. When solid polymer electrolytes are used as electrolytes, the solid polymer electrolytes may also be used as the separators.

Examples of the separator may include: multi-layers consisting of two or more layers of polyethylene, polypropylene, polyvinylidene fluoride, or combinations thereof; and mixed multi-layers such as polyethylene/polypropylene double layer separators, polyethylene/polypropylene/polyethylene triple layer separators, and polypropylene/polyethylene/polypropylene triple layer separators.

An electrolyte according to an embodiment is used as an electrolyte in a lithium metal battery.

A lithium metal battery according to an embodiment may additionally include one or more selected from a liquid electrolyte, a solid electrolyte, a gel electrolyte, and a polymer ionic liquid that is suitable for use as an electrolyte.

A lithium metal battery according to other embodiment may additionally include one or more selected from a liquid electrolyte, a solid electrolyte, a gel electrolyte and a polymer ionic liquid, and a separator.

The liquid electrolyte additionally includes one or more selected from an organic solvent, an ionic liquid, and a lithium salt.

Suitable materials that are used as the organic solvent in the lithium metal battery may be used as the organic solvent, non-limiting examples of the organic solvent may include a carbonate based compounds, a glyme based compounds, and a dioxolane based compound.

Examples of the carbonate based solvent may include ethylene carbonate, propylene carbonate, dimethyl carbonate, fluoroethylene carbonate, diethyl carbonate, and ethylmethyl carbonate.

Examples of the glyme based solvent may include one or more selected from poly(ethylene glycol) dimethyl ether (PEGDME, polyglyme), tetra(ethylene glycol) dimethyl ether (TEGDME, tetraglyme), tri(ethylene glycol) dimethyl ether (triglyme), poly(ethylene glycol) dilaurate (PEGDL), poly(ethylene glycol) monoacrylate (PEGMA), and poly(ethylene glycol) diacrylate (PEGDA).

Examples of the dioxolane based compounds may include one or more selected from the group consisting of 3-dioxolane, 4,5-diethyl-dioxolane, 4,5-dimethyl-dioxolane, 4-methyl-1,3-dioxolane, and 4-ethyl-1,3-dioxolane.

Examples of the organic solvent may include 2,2-dimethoxy-2-phenylacetophenone, dimethoxyethane, diethoxyethane, tetrahydrofuran, and gamma butyrolactone.

The gel electrolyte is a gel-shaped electrolyte, and the gel electrolyte may include all of the materials if materials are well-known materials for the gel electrolyte in the art.

For example, the gel electrolyte may contain a polymer and a polymer ionic liquid.

For example, the polymer may be a solid graft (block) copolymer electrolyte.

The solid electrolyte may be an organic solid electrolyte or an inorganic solid electrolyte.

Examples of the organic solid electrolyte may include a polyethylene derivative, a polyethylene oxide derivative, a polypropylene oxide derivative, a phosphate ester polymer, polyester sulfide, polyvinyl alcohol, polyvinylidene fluoride, or a polymer including an ionic dissociative group.

Examples of the inorganic solid electrolyte may include $Cu_3N$, $Li_3N$, LiPON, $Li_3PO_4.Li_2S.SiS_2$, $Li_2S.GeS_2.Ga_2S_3$, $(Na, Li)_{1+x}Ti_{2-x}Al_x(PO_4)_3$ ($0.1 \leq x \leq 0.9$), $Li_{1+x}Hf_{2-x}Al_x(PO_4)_3$ ($0.1 \leq x \leq 0.9$), $Na_3Zr_2Si_2PO_{12}$, $Li_3Zr_2Si_2PO_{12}$, $Na_5ZrP_3O_{12}$, $Na_5TiP_3O_{12}$, $Na_3Fe_2P_3O_{12}$, $Na_4NbP_3O_{12}$, $NLi_{0.3}La_{0.5}TiO_3$, $Na_5MSi_4O_{12}$ (M is rare earth elements such as Nd, Gd, and Dy), $Li_5ZrP_3O_{12}$, $Li_5TiP_3O_{12}$, $Li_3Fe_2P_3O_{12}$, $Li_4NbP_3O_{12}$, $Li_{1+x}(M,Al,Ga)_x(Ge_{1-y}Ti_y)_{2-x}(PO_4)_3$ ($0 \leq x \leq 0.8$, $0 \leq y \leq 1.0$, and M is Nd, Sm, Eu, Gd, Tb, Dy, Ho, Er, Tm, or Yb), $Li_{1+x+y}Q_xTi_{2-x}Si_yP_{3-y}O_{12}$ ($0<x \leq 0.4$, $0<y \leq 0.6$, and Q is Al or Ga), $Li_6BaLa_2Ta_2O_{12}$, $Li_7La_3Zr_2O_{12}$, $Li_5La_3Nb_2O_{12}$, $Li_5La_3M_2O_{12}$ (M is Nb or Ta), and $Li_{7+x}A_xLa_{3-x}Zr_2O_{12}$ ($0<x<3$ and A is Zn).

The polymer ionic liquid may be, for example, a polymerization product of ionic liquid monomers, or a polymeric compound. The polymer ionic liquid is highly dissoluble in an organic solvent, and thus may further improve the ionic conductivity of the electrolyte when further added.

When the polymer ionic liquid is obtained by polymerizing the above-described ionic liquid monomers, the polymer ionic liquid is prepared such that it has appropriate anions which are capable of imparting solubility with respect to an organic solvent through an anion substitution reaction after passing a polymerization reaction-completed product through cleaning and drying processes.

The polymer ionic liquid according to an exemplary embodiment may include a repeating unit including i) at least one cation of an ammonium-based cation, a pyrrolidinium-based cation, a pyridinium-based cation, a pyrimidinium-based cation, an imidazolium-based cation, a piperidinium-based cation, a pyrazolium-based cation, an oxazolium-based cation, a pyridazinium-based cation, a phosphonium-based cation, a sulfonium-based cation, a triazole-based cation, and a mixture thereof, ii) at least one anion of $BF_4^-$, $PF_6^-$, $AsF_6^-$, $SbF_6^-$, $AlCl_4^-$, $HSO_4^-$, $ClO_4^-$, $CH_3SO_3^-$, $CF_3CO_2^-$, $(CF_3SO_2)_2N^-$, $(FSO_2)_2N^-$, $Cl^-$, $Br^-$, $I^-$, $SO_4^-$, $CF_3SO_3^-$, $(C_2F_5SO_2)_2N^-$, $(C_2F_5SO_2)(CF_3SO_2)N^-$, $NO_3^-$, $Al_2Cl_7^-$, $(CF_3SO_2)_3C^-$, $(CF_3)_2PF_4^-$, $(CF_3)_3PF_3^-$, $(CF_3)_4PF_2^-$, $(CF_3)_5PF^-$, $(CF_3)_6P^-$, $SF_5CF_2SO_3^-$, $SF_5CHFCF_2SO_3^-$, $CF_3CF_2(CF_3)_2CO^-$, $(CF_3SO_2)_2CH^-$, $(SF_5)_3C^-$, and $(O(CF_3)_2C_2(CF_3)_2O)_2PO^-$.

A polymer ionic liquid according to other embodiment may be prepared by polymerizing an ionic liquid monomer. The ionic liquid monomer may have the anions, and one or more cations selected from an ammonium based cation, a pyrrolidinium based cation, a pyridinium based cation, a pyrimidinium based cation, an imidazolium based cation, a piperidinium based cation, a pyrazolium based cation, an oxazolium based cation, a pyridazinium based cation, a phosphonium based cation, a sulfonium based cation, a triazole based cation, and mixtures thereof while having functional groups that are capable of being polymerizable with a vinyl group, an allyl group, an acrylate group, and a methacrylate group.

The ionic liquid monomer may comprise, for example, 1-vinyl-3-ethylimidazolium bromide or a compounds represented by the following Formula 4, or a compound represented by the following Formula 5:

Formula 4

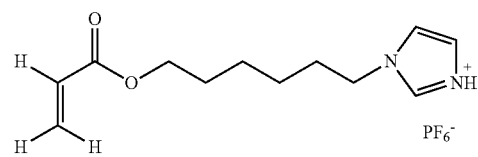

Formula 5

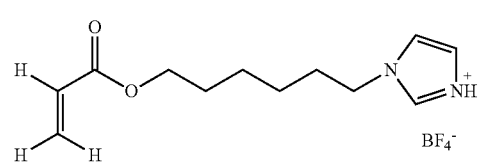

The above-described polymer ionic liquid may be, for example, a compound represented by the following Formula 6 or compounds represented by the following Formula 7:

Formula 6

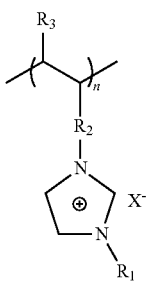

wherein in Formula 6, $R_1$ and $R_3$ each independently is hydrogen, a substituted or unsubstituted $C_1$-$C_{30}$ alkyl group, a substituted or unsubstituted $C_2$-$C_{30}$ alkenyl group, a substituted or unsubstituted $C_2$-$C_{30}$ alkynyl group, a substituted or unsubstituted $C_6$-$C_{30}$ aryl group, a substituted or unsubstituted $C_2$-$C_{30}$ heteroaryl group, or a substituted or unsubstituted $C_4$-$C_{30}$ carbocyclic group, and $R_2$ represents a chemical bond, or represents a $C_1$-$C_3$ alkylene group, a $C_6$-$C_{30}$ arylene group, a $C_2$-$C_{30}$ heteroarylene group, or a $C_4$-$C_{30}$ carbocyclic group, $X^-$ represents an anion of an ionic liquid, and n may be from 500 to 2800; and Formula 7

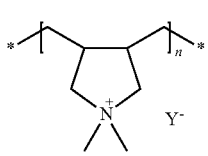

wherein in Formula 7, $Y^-$ is defined in the same as $X^-$ as defined in Formula 6, n may be from 500 to 2800. In formula 7, and $Y^-$ is bis(trifluoromethanesulfonyl)imide (TFSI), $BF_4$, or $CF_3SO_3$.

Examples of the polymer ionic liquid may include cations poly(1-vinyl-3-alkylimidazolium), poly(1-allyl-3-alkylimidazolium), and (poly(1-(methacryloyloxy)-3-alkylimidazolium), and anions selected from $CH_3COO^-$, $CF_3COO^-$, $CH_3SO_3^-$, $CF_3SO_3^-$, $(CF_3SO_2)_2N^-$, $(FSO_2)_2N^-$, $(CF_3SO_2)_3C^-$, $(CF_3CF_2SO_2)_2N^-$, $C_4F_9SO_3^-$, $C_3F_7COO^-$, and $(CF_3SO_2)(CF_3CO)N^-$.

Examples of compounds represented by Formula 7 may include poly(diallyldimethylammonium bis(trifluoromethanesulfonyl)imide).

Examples of a polymer ionic liquid according to other embodiment may include a low molecular weight polymer, a thermally stable ionic liquid, and a lithium salt. The low molecular weight polymer may have an ethylene oxide chain. The low molecular weight polymer may be a glyme. Here, examples of the glyme may include polyethylene glycol dimethyl ether (polyglyme), tetraethylene glycol dimethyl ether (tetraglyme), and triethylene glycol dimethyl ether (triglyme).

The low molecular weight polymer may have a weight average molecular weight of about 75 to about 2000 Daltons, e.g., about 250 to about 500 Daltons.

As shown in FIG. 1, the lithium metal battery 11 includes a positive electrode 13, a lithium negative electrode 12, and a separator 14. The positive electrode 13, the negative electrode 12 and the separator 14 are wound or folded before they are accommodated into a battery case 15. Subsequently, an electrolyte according to an embodiment is injected into the battery case 15, and the battery case 15 containing the electrolyte is sealed by a cap assembly 16 to complete the lithium metal battery 11. Examples of the battery case may include a cylindrical battery case, a rectangular battery case, a thin film type battery case, etc. For example, the lithium metal battery may be a large thin film type battery. The lithium metal battery may be a lithium ion battery.

The lithium metal battery may be used in electric vehicles (EVs) since the lithium metal battery is excellent in lifetime characteristics and high-rate characteristics. For example, the lithium metal battery may be used in hybrid vehicles such as plug-in hybrid electric vehicles (PHEVs), etc. Further, the lithium metal battery may be used in fields in which storage of a large amount of electric power is required. For example, the lithium metal battery may be used in electric bicycles, electric tools, etc.

Hereinafter, the electrolyte and the lithium metal battery according to exemplary embodiments of the present disclosure are described more in detail through the following Examples and Comparative Examples. However, such embodiments are provided for illustrative purposes only, and the scope of the present invention should not be limited thereto in any manner. Further, it should be understood that the present disclosure is not limited to the above descriptions since other various modifications of the present disclosure may occur to persons having ordinary knowledge in the related art of the present disclosure.

EXAMPLES

Example 1: Preparation of Electrolyte

Lithium bis(fluorosulfonyl)imide (LiFSI) as a lithium salt was mixed with 1,1,2,2-tetrafluoroethyl 2,2,3,3-tetrafluoropropyl ether (TTE) and ethylene glycol dimethylether (1,2-dimethoxyethane, DME) having a volume ratio of about 20:80 to prepare a 5 molar (M) electrolyte.

Example 2: Preparation of Electrolyte

The electrolyte was prepared in the same manner as Example 1 except that the amount of lithium bis(fluorosulfonyl)imide was changed in order to obtain a 7M electrolyte. 1,1,2,2-tetrafluoroethyl 2,2,3,3-tetrafluoropropyl ether (TTE) and ethylene glycol dimethylether (1,2-dimethoxyethane, DME) had a mixing volume ratio of about 20:80.

Example 3: Preparation of Electrolyte

The electrolyte was prepared in the same manner as Example 1 except that the amount of lithium bis(fluorosulfonyl)imide was changed in order to obtain a 2.5M electrolyte. 1,1,2,2-tetrafluoroethyl 2,2,3,3-tetrafluoropropyl ether (TTE) and ethylene glycol dimethylether (1,2-dimethoxyethane, DME) had a mixing volume ratio of about 20:80.

Example 4: Preparation of Electrolyte

The electrolyte was prepared in the same manner as Example 1 except that the amount of lithium bis(fluorosulfonyl)imide was changed in order to obtain a 3.3M electrolyte, and 1,1,2,2-tetrafluoroethyl 2,2,3,3-tetrafluoropropyl ether (TTE) and ethylene glycol dimethylether (1,2-dimethoxyethane, DME) had a mixing volume ratio of about 30:70.

Example 5: Preparation of Electrolyte

A 5M electrolyte was prepared in the same manner as Example 1 except that $HCF_2CF_2OCH_2CH_2CH_2OCF_2CF_2CF_2H$ instead of 1,1,2,2-tetrafluoroethyl 2,2,3,3-tetrafluoropropyl ether (TTE) was used.

Example 6: Preparation of Electrolyte

The electrolyte was prepared in the same manner as Example 1 except that the amount of lithium bis(fluorosulfonyl)imide as a lithium salt was changed in order to obtain a 2.5M electrolyte, and 1,1,2,2-tetrafluoroethyl 2,2,3,3-tetrafluoropropyl ether (TTE) and ethylene glycol dimethylether (1,2-dimethoxyethane, DME) had a mixing volume ratio of about 40:60.

Example 7: Preparation of Electrolyte

An electrolyte was prepared in the same manner as Example 3 except that 2,2,3,3,4,4,5,5-octafluoropentyl-1,1,2,2-tetrafluoroethyl ether (OTE) instead of 1,1,2,2-tetrafluoroethyl 2,2,3,3-tetrafluoropropyl ether (TTE) was used.

Example 8: Preparation of Electrolyte

An electrolyte was prepared in the same manner as Example 3 except that $HCF_2CF_2OCH_2CH_2OCF_2CF_2H$ instead of 1,1,2,2-tetrafluoroethyl 2,2,3,3-tetrafluoropropyl ether (TTE) was used.

Example 9: Preparation of Electrolyte

An electrolyte was prepared in the same manner as Example 3 except that a 1.5M electrolyte was prepared by using $LiPF_6$ instead of LiFSI as a lithium salt and additionally adding dimethyl carbonate (DMC), thereby controlling a mixing volume ratio of 1,1,2,2-tetrafluoroethyl 2,2,3,3-tetrafluoropropyl ether (TTE), ethylene glycol dimethylether (1,2-dimethoxyethane, DME) and DMC to about 20:60:20.

$LiPF_6$ was used in a more excessive amount than LiFSI since a lithium solvation efficiency is reduced when $LiPF_6$ is used as a lithium salt compared to when LiFSI is used as the lithium salt.

Example 10: Manufacturing of Lithium Metal Battery

LiCoO2, a conducting agent Super-P produced by Timcal Ltd., polyvinylidene fluoride (PVdF), and N-pyrrolidone were mixed to obtain a positive electrode composition. The positive electrode composition included $LiCoO_2$, a conducting agent, and PVDF having a mixing weight ratio of about 97:1.5:1.5.

The positive electrode composition was coated on the top of an aluminum foil with a thickness of about 15 μm, and then the resultant product was dried at about 25° C., and then thermal treated under vacuum at about 110° C. under vacuum, so as to obtain a positive electrode.

A polyethylene/polypropylene separator was disposed between the positive electrode obtained according to the above-described process and a lithium metal negative electrode with a thickness of about 20 μm, thereby preparing a lithium metal battery (coin cell). The electrolyte of Example 1 was added to the lithium metal battery (coin cell).

Examples 11 to 16: Manufacturing of Lithium Metal Batteries

Lithium metal batteries were manufactured by performing a lithium metal battery-manufacturing process according to the same method as Example 10 except that the electrolytes of Examples 2 to 7 instead of the electrolyte of Example 1 were used.

Comparative Example 1: Preparation of Electrolyte

Preparation of an electrolyte was tried by performing an electrolyte-preparing process according to the same method as Example 3 except that compounds represented by the following Formula instead of 1,1,2,2-tetrafluoroethyl 2,2,3,3-tetrafluoropropyl ether (TTE) were used:

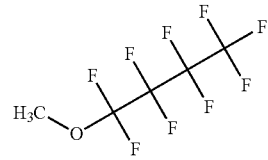

Comparative Example 2: Preparation of Electrolyte

Lithium bis(fluorosulfonyl)imide (LiFSI) as a lithium salt was mixed with ethylene glycol dimethylether (1,2-dimethoxyethane, DME) in an amount of about 17.7% by weight to prepare a 5M electrolyte.

Comparative Example 3: Preparation of Electrolyte

Lithium bis(fluorosulfonyl)imide (LiFSI) as a lithium salt was mixed with dimethyl carbonate (DMC) and ethylene glycol dimethylether (1,2-dimethoxyethane, DME) having a volume ratio of about 6:4 in an amount of about 27% by weight to prepare a 5M electrolyte.

Comparative Example 4: Preparation of Electrolyte

An electrolyte was prepared in the same manner as Example 1 except that 1,1,2,2-tetrafluoroethyl 2,2,3,3-tetrafluoropropyl ether (TTE) and ethylene glycol dimethylether (1,2-dimethoxyethane, DME) having a volume ratio of about 5:5 were used.

Comparative Example 5: Preparation of Electrolyte

An electrolyte was prepared in the same manner as Example 1 except that 1,1,2,2-tetrafluoroethyl 2,2,3,3-tetrafluoropropyl ether (TTE) and ethylene glycol dimethylether (1,2-dimethoxyethane, DME) having a volume ratio of about 4:6 were used.

Since combustibility of the electrolyte was increased to result in a high risk when the amount of DME was higher than that of TTE as in Comparative Example 5. As a result, the electrolyte was not appropriate for being used as an electrolyte.

Comparative Examples 6 to 10: Manufacturing of Lithium Metal Batteries

Lithium metal batteries were manufactured by performing a lithium metal battery-manufacturing process according to the same method as Example 10 except that the electrolytes of Comparative Examples 1 to 5 instead of the electrolyte of Example 1 were used.

Comparative Example 11: Manufacturing of Lithium Metal Battery

A lithium metal battery was manufactured by performing a lithium metal battery-manufacturing process according to the same method as Example 10 except that a graphite negative electrode manufactured according to the following process instead of a lithium negative electrode was used.

Graphite and polyvinylidene fluoride having a weight ratio of about 85:15 were mixed to obtain a mixture, the mixture was coated on a copper foil, and the mixture coated on the copper foil was roll-pressed and dried to manufacture a graphite negative electrode.

A polyethylene/polypropylene separator was disposed between the positive electrode and the graphite negative electrode obtained according to the above-described processes, thereby preparing a lithium metal battery (coin cell). The electrolyte of Example 1 was added to the lithium metal battery (coin cell).

Evaluation Example 1: Degree of Mixing Test

Degrees of mixing on the electrolytes were studied by judging dissolution states of respective constituents with the naked eye in the electrolytes obtained according to Example 3, Example 7, and Comparative Example 1.

Figure 2A:
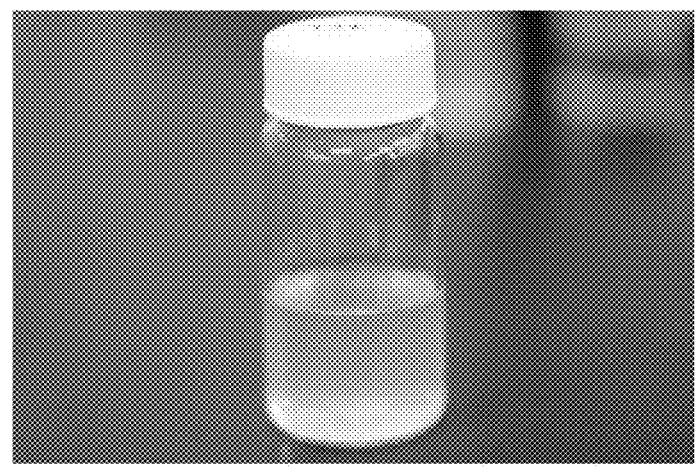
FIG. 2A shows the results of a mixing test for the electrolytes prepared according to Examples 3 and 7.
Figure 2B:
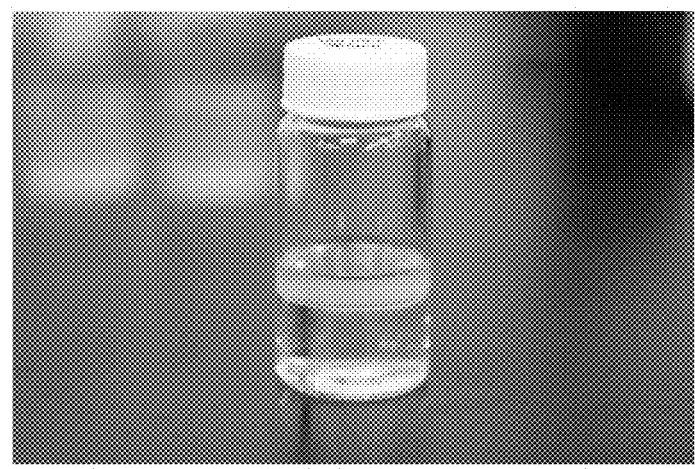
FIG. 2B shows the results of a mixing test for an electrolyte prepared according to Comparative Example 1.

The solubility test results are represented as in FIGS. 2A and 2B.

As represented as in FIGS. 2A and 2B, TTE of Example 3 and OTE of Example 7 shown an excellent degree of mixing state thereof by forming a uniform solution with respect to a lithium salt and DME as represented in FIG. 2A. On the contrary, as shown in FIG. 2B, a layer separation phenomenon in which a layer was separated into two phases was observed, and it was difficult to obtain an electrolyte having a uniform composition since a degree of mixing on the lithium salt and DME was lowered due to a high polarity of fluorine substituted ether of Comparative Example 1.

Evaluation Example 2: Viscosity and Ion Conductivity Tests

1) Examples 1 to 3

Viscosities and ion conductivities of the electrolytes prepared according to Examples 1 to 3 were examined.

Viscosities of the electrolytes were measured by using a rheometer of Anton Paar Corporation, using a Rheoplus MCR302 viscosity-measuring tip with an equipment name of CP50-1, and using a method of obtaining an average after taking five points by measuring the viscosities per about 25 seconds at a measurement condition of about 25° C.

The ion conductivities of the electrolytes were evaluated by giving a voltage bias of about 10 mV to the electrolytes in a frequency range of about 1 Hz to about 1 MHz and measuring resistance of the electrolytes.

Evaluation results were represented in the following Table 1.

TABLE 1

| Classification | Molarity of electrolytes | Viscosities (cP) | Ion conductivities (mS/cm) |
|---|---|---|---|
| Example 1 | 1M DME ref. (5M) | 3.068 | 3.905 |
| Example 2 | 1.4M DME ref. (7M) | 3.716 | 2.381 |
| Example 3 | 0.5M DME ref. (2.5M) | 1.373 | 3.438 |

Figure 3:
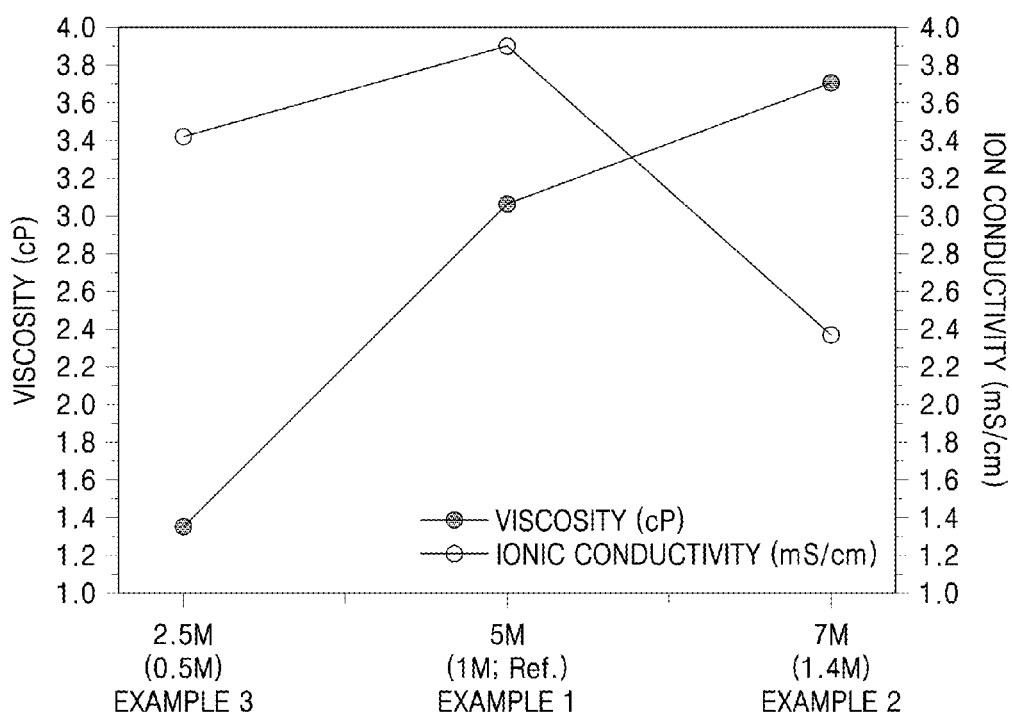
FIG. 3 shows the viscosity (centipoise, cP) and ion conductivity (milliSiemens per centimeter, mS/cm) for electrolytes prepared according to Examples 1 to 3.

As represented in FIG. 3 and Table 1, ion conductivities of the electrolytes were excellent while viscosities of the electrolytes were appropriate although the electrolytes had high molarity when the electrolytes prepared according to Examples 1 to 3 were used.

2) Examples 1, 4, 6, and Comparative Example 4

The examined viscosities and ion conductivities were represented in the following Table 2 and FIG. 4 after examining viscosities and ion conductivities of the electrolytes according to the same methods as those used for measuring viscosities and ion conductivities of the electrolytes prepared according to Examples 1 to 3.

TABLE 2

| Classification | Viscosities (cP) | Ion conductivities (mS/cm) |
|---|---|---|
| Example 1 | 3.068 | 3.905 |
| Example 4 | 3.243 | 5.465 |
| Example 6 | 3.59 | 6.269 |
| Comparative Example 4 | 3.02 | 7.03 |

Figure 4:
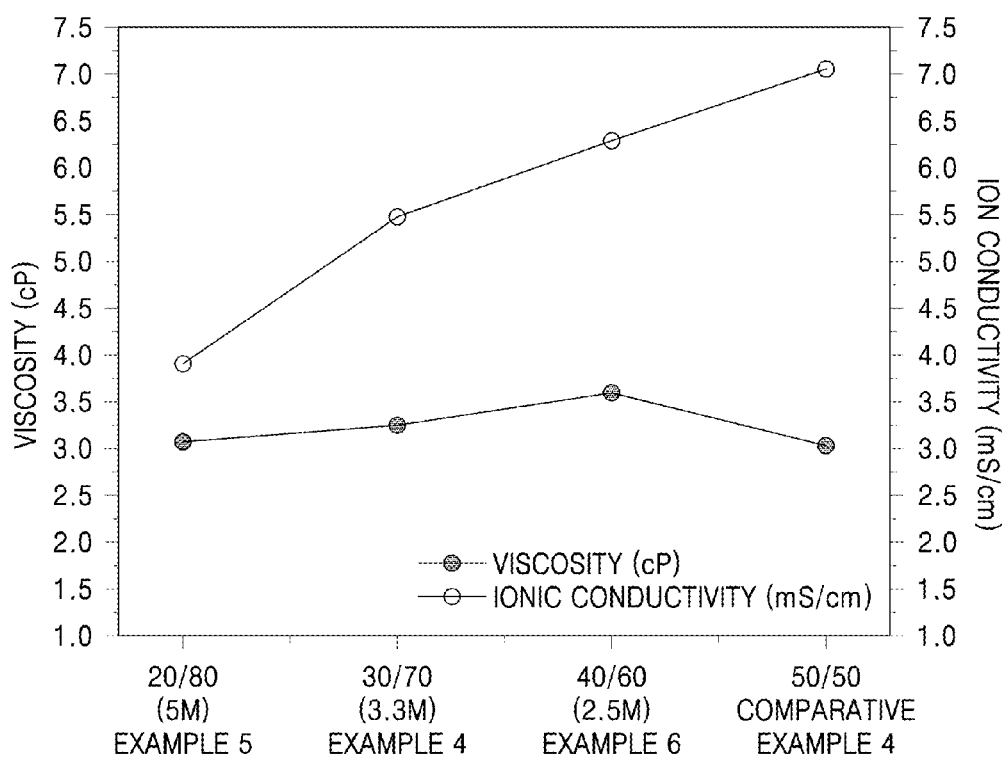
FIG. 4 shows the viscosity (centipoise) and ion conductivity (milliSiemens per centimeter) of electrolytes prepared according to Examples 1, 4 and 6, and Comparative Example 4.

As represented in FIG. 4 and Table 4, the electrolytes had appropriate viscosities and excellent ion conductivities although the electrolytes prepared according to Examples 1, 4, and 6 had high concentration values. The electrolytes prepared according to Comparative Example 4 exhibited good viscosity and ion conductivity as represented in Table 2. The electrolyte prepared according to Comparative Example 4 exhibited a result that electrochemical stability of the electrolyte was decreased as it can be seen from the following cyclic voltammetry analysis results.

Evaluation Example 3: Charge/Discharge Characteristics (Lifetime Characteristics)

1) Examples 10 to 12

Each of the lithium metal batteries manufactured by the Examples 10 to 12 were charged at a constant current of about 0.1 C rate at about 25° C. until a voltage reached about 4.30 V (vs. Li). The lithium metal batteries maintained a constant voltage thereof to 4.30 V was discharged and then the constant voltage was cut-off at a current of 0.05 C rate. Next, the lithium batteries were discharged at a constant current of 0.1 C rate until a voltage of the lithium batteries reached 2.8V (vs. Li) ($1^{st}$ cycle in formation process).

Such charging and discharging processes were performed two cycles more to complete the formation process.

The lithium batteries subjected to the two cycle in the formation process were charged at a constant current of i) about 0.5 C rate or ii) about 1 C at about room temperature (25° C.) until a voltage of the lithium batteries reached in a voltage range of about 3.0 V to about 4.4 V. The lithium metal batteries were discharged at a constant current of about 0.2 C rate by a current of about 0.72 mA until the voltage reached to a cut-off voltage of about 4.4 V.

The above-described charging and discharging processes were repeatedly performed 99 cycles to repeatedly perform the charging and discharging processes totally 100 cycles.

Capacity retention rates are calculated from the following Equation 1:

Capacity retention rate (%)=(discharge capacity at the 100$^{th}$ cycle/discharge capacity at the first cycle)×100    Equation 1

Figure 5:
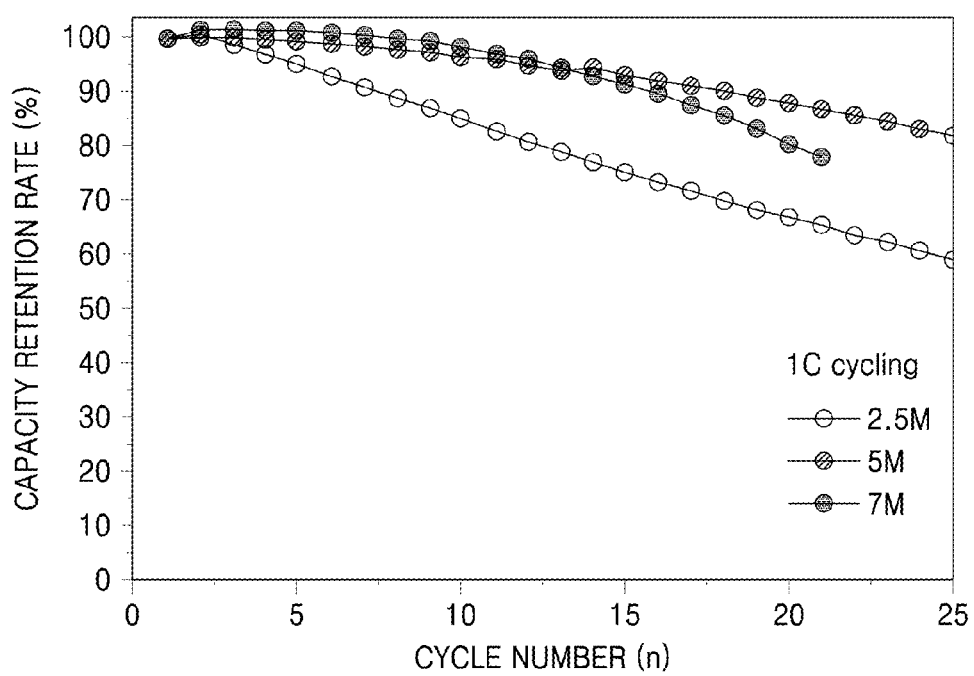
FIG. 5 is a graph of capacity retention rate (percent) versus cycle number which shows changes in the discharge capacities of lithium metal batteries manufactured according to Examples 10 to 12.

Results of evaluating charge/discharge characteristics of the lithium metal batteries manufactured according to Examples 10 to 12 are the same as discharge capacity changes are represented in FIG. 5 while the charging and discharging processes are repeatedly performed 25 cycles.

2) Examples 10, 13 and 15, and Comparative Example 10

Figure 6:
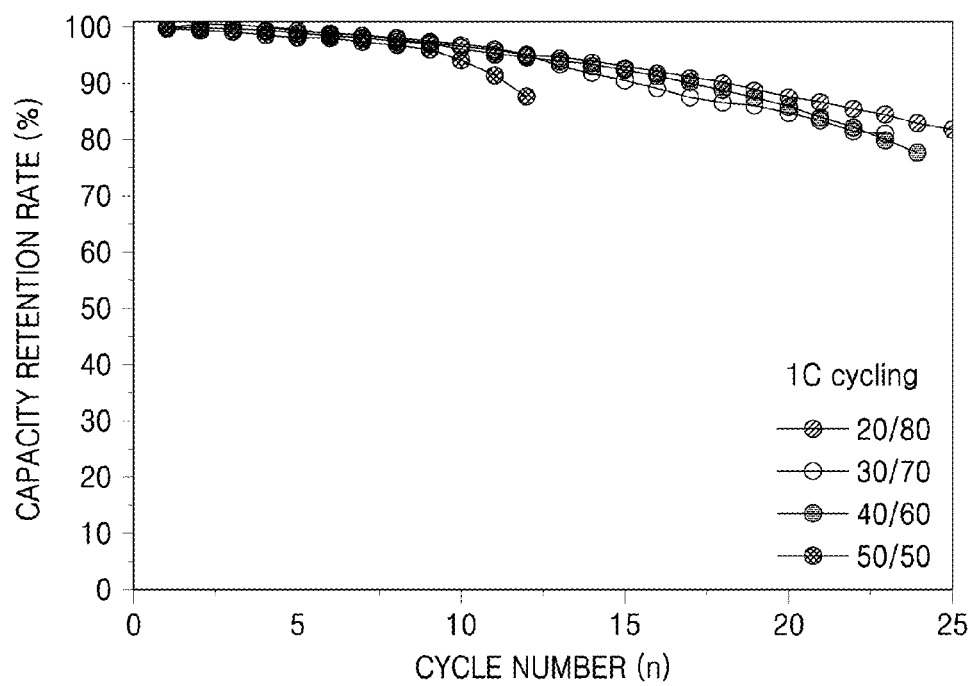
FIG. 6 is a graph of capacity retention rate (percent) versus cycle number which shows changes in discharge capacities of lithium metal batteries manufactured according to Examples 10, 13 and 15, and Comparative Example 9.

After evaluating changes in discharge characteristics of the lithium metal batteries manufactured according to Examples 10, 13 and 15, and Comparative Example 10 according to the same method as Examples 10 and 12, the evaluated results of the changes in discharge characteristics of the lithium metal batteries were represented in FIG. 6.

As shown in FIG. 6, it could be seen that lifetime characteristics of the lithium metal batteries manufactured according to Examples 10, 13 and 15 were improved compared to the lithium metal battery manufactured according to Comparative Example 10.

Examples 10 and 16

Figure 7:
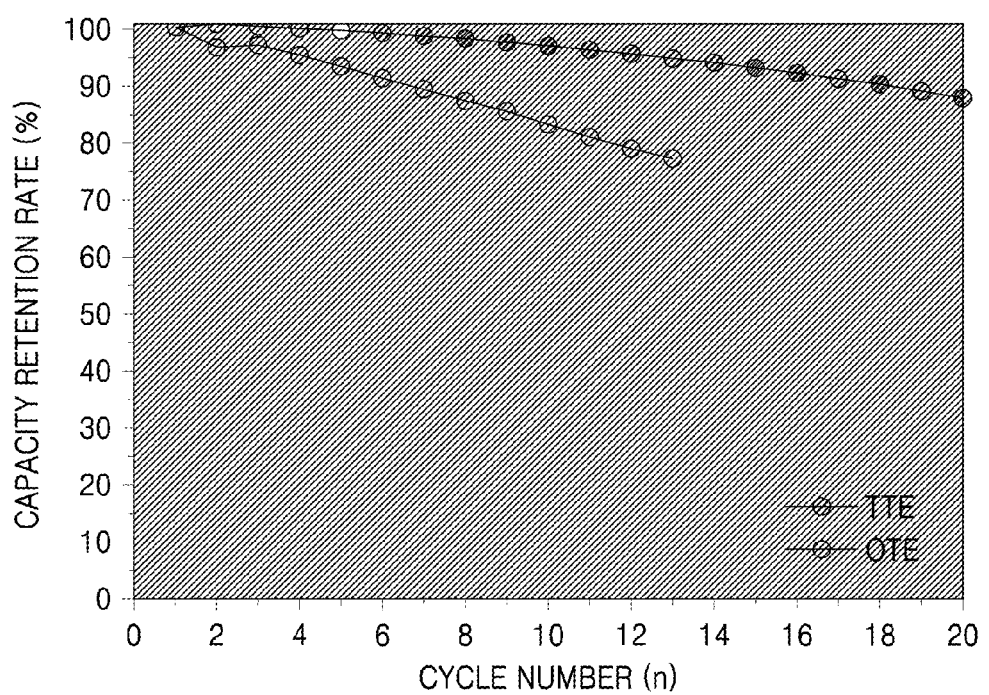
FIG. 7 is a graph of capacity retention rate (percent) versus cycle number which shows changes in the discharge capacities of lithium metal batteries manufactured according to Examples 10 and 16.

After evaluating changes in discharge characteristics of the lithium metal batteries manufactured according to Examples 10 and 16 according to the same method as Examples 10 and 12, the evaluated results of the changes in discharge characteristics of the lithium metal batteries were represented in FIG. 7.

As shown in FIG. 7, it could be seen that the lithium metal batteries manufactured according to Examples 10 and 16 had excellent lifetime characteristics.

Evaluation Example 4: Evaluation of Electrochemical Stabilities

1) Example 10, and Comparative Examples 7, 8 and 11

Electrochemical stabilities on electrolytes of the lithium metal batteries manufactured in Example 10 and Comparative Examples 7, 8 and 11 were evaluated by cyclic voltammetry at a scan rate of about 1 mV/sec in a voltage range of about 0 to about 6 V (vs. Li).

Figure 8A:
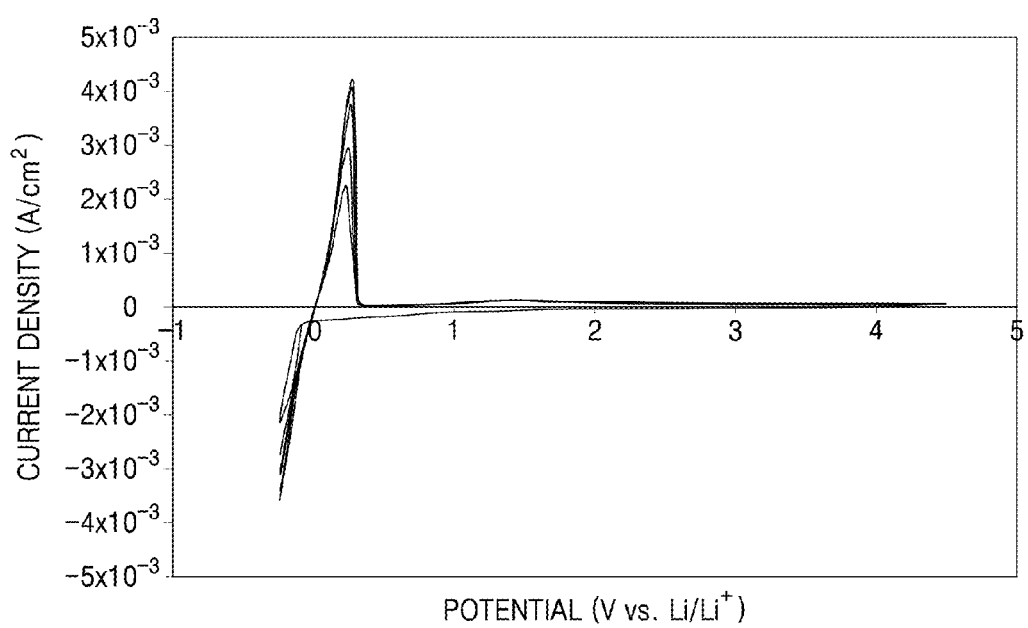
FIGS. 8A and 8B are each a graph of current density (amperes per square centimeter, A/cm²) versus potential (volts versus Li/Li⁺) and show cyclic voltammetry analysis results of a lithium metal battery manufactured according to Example 10.
Figure 8B:
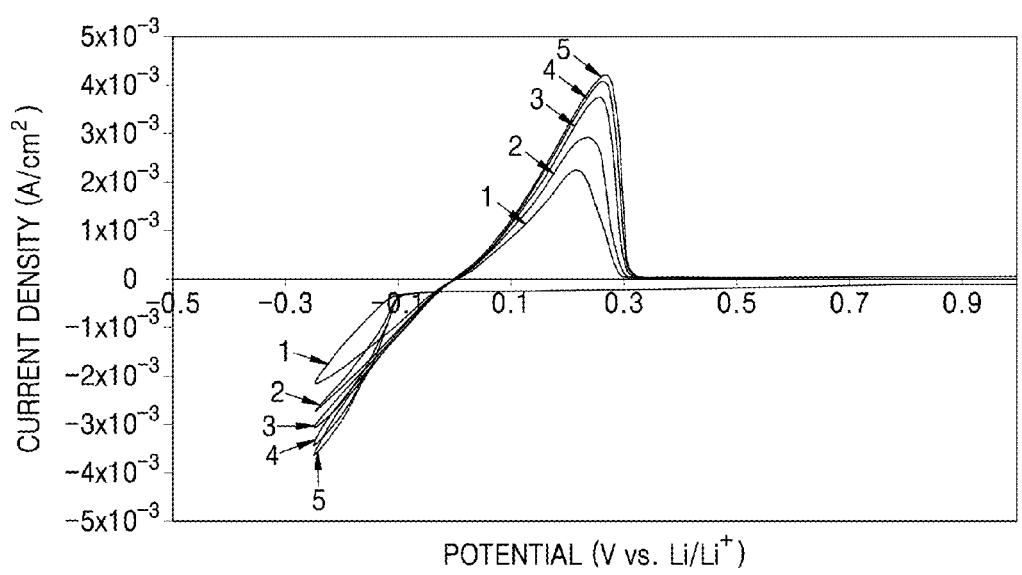

The analysis results according to cyclic voltammetry of the lithium metal battery manufactured according to Example 10 were shown in FIGS. 8A and 8B. Further, the analysis results according to cyclic voltammetry of the lithium metal battery manufactured according to Comparative Example 7 were represented in FIGS. 9A and 9B, and the analysis results according to cyclic voltammetry of the lithium metal battery manufactured according to Comparative Example 8 were represented in FIGS. 10A and 10B.

As results of evaluation, oxidation-reduction reaction peaks resulting from the decomposition of the electrolyte besides intercalation/deintercalation of lithium were not observed near about 0 V in the lithium metal battery manufactured according to Example 10 as shown in FIGS. 8A and 8B. With this, it could be seen that other side reactions do not occur without decomposition of the electrolyte, and side reactions such as oxidation and so on up to a voltage of about 5.0 V generated an insignificant current value of about 0.02 mA/cm$^2$. Further, it could be seen that current values associated with the lithium ion deposition efficiency were increased according as the cycle was repeated. Like this, it could be seen that the electrolyte of the lithium metal battery manufactured according to Example 7 was electrochemically stable in a voltage range of about 0 to about 5 V.

Figure 9A:
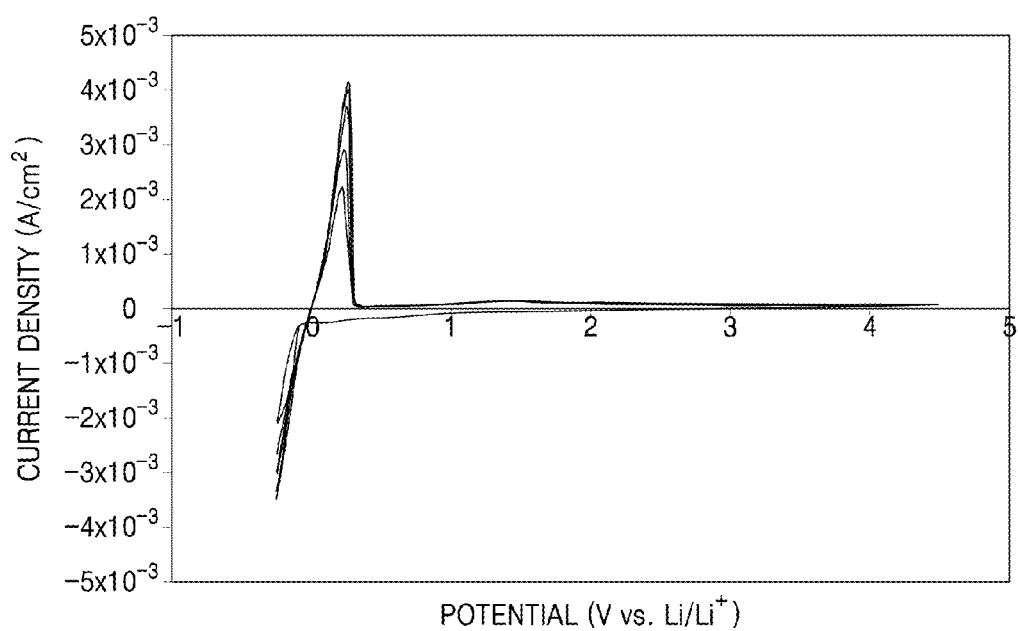
FIGS. 9A and 9B are each a graph of current density (amperes per square centimeter, A/cm²) versus potential (volts versus Li/Li⁺) which shows cyclic voltammetry analysis results of a lithium metal battery manufactured according to Comparative Example 7.
Figure 9B:
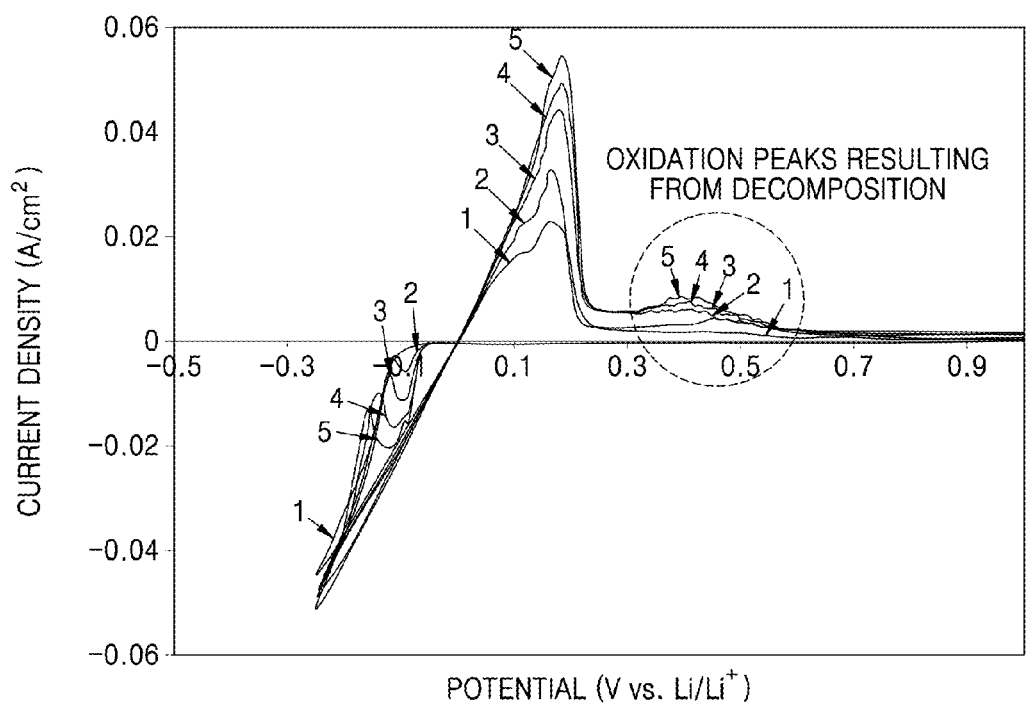
Figure 10A:
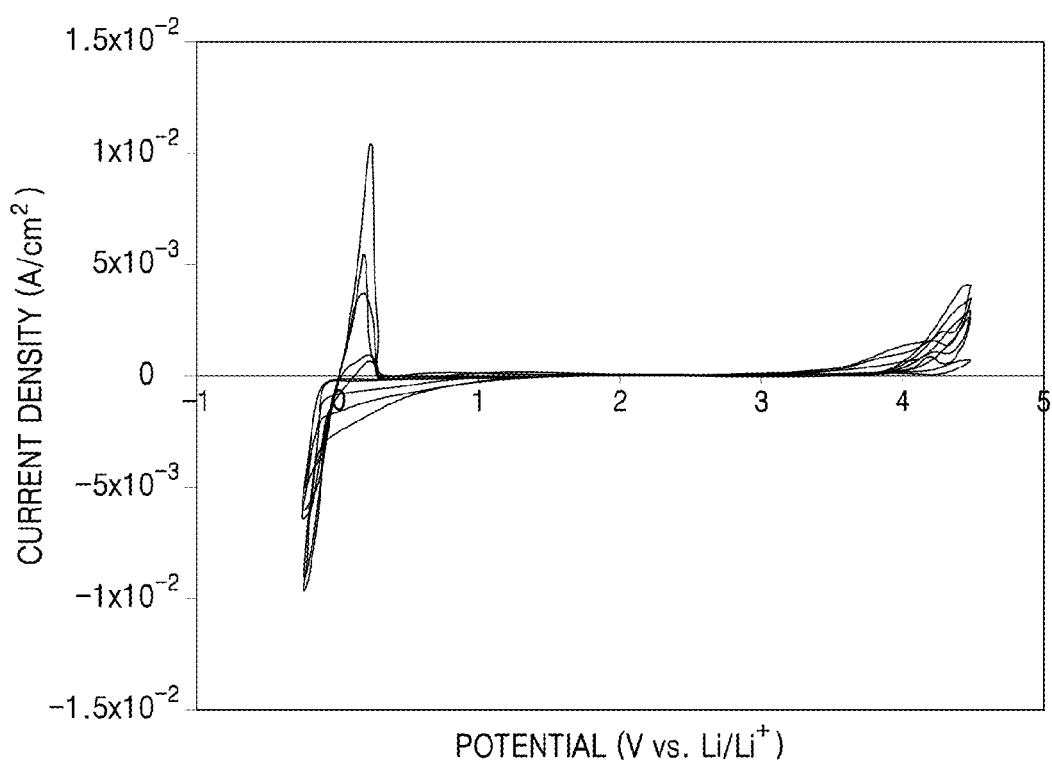
FIGS. 10A to 10C are each a graph of current density (amperes per square centimeter, A/cm$^2$) versus potential (volts versus Li/Li$^+$) which shows cyclic voltammetry analysis results of a lithium metal battery manufactured according to Comparative Example 8.
Figure 10B:
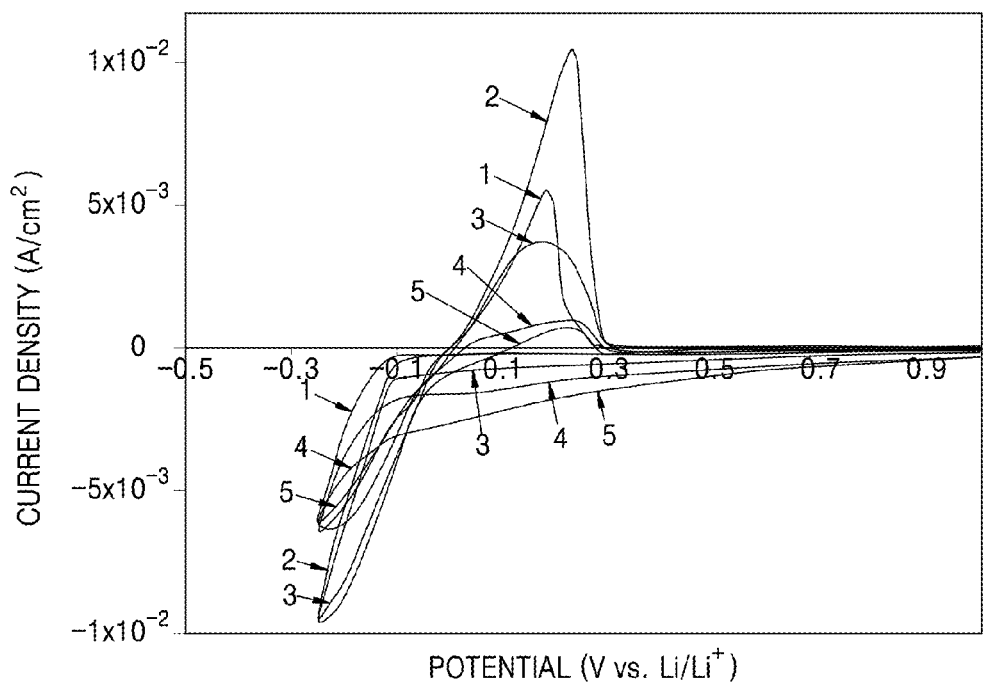
Figure 10C:
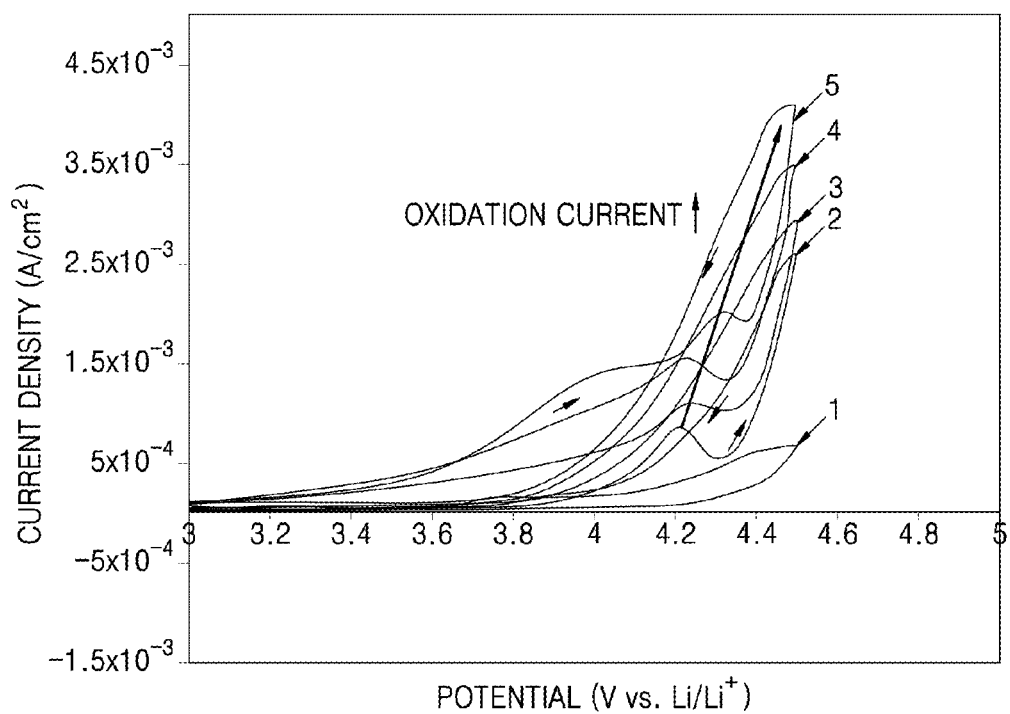

On the contrary, oxidation peaks of the electrolytes were not observed in the lithium metal battery of Comparative Example 7 as shown in FIGS. 9A and 9B. However, peaks resulting from side reactions of the electrolytes were observed. Oxidation peaks resulting from the decomposition of the electrolyte from a CV phase were observed in the lithium metal battery manufactured according to Comparative Example 8. Accordingly, it could be seen that peak intensities directly connected to deposition/stripping efficiency were reduced according as the cycle is repeated due to the formation of a coating film represented by a resistance layer on an interface between the electrode and the electrolyte.

Further, peaks that seemed to result from a side reaction of the electrolyte were observed in a lithium metal battery manufactured according to Comparative Example 11 as in the lithium metal battery manufactured according to Comparative Example 7.

2) Example 15 and Comparative Examples 9 and 10

Figure 9C:
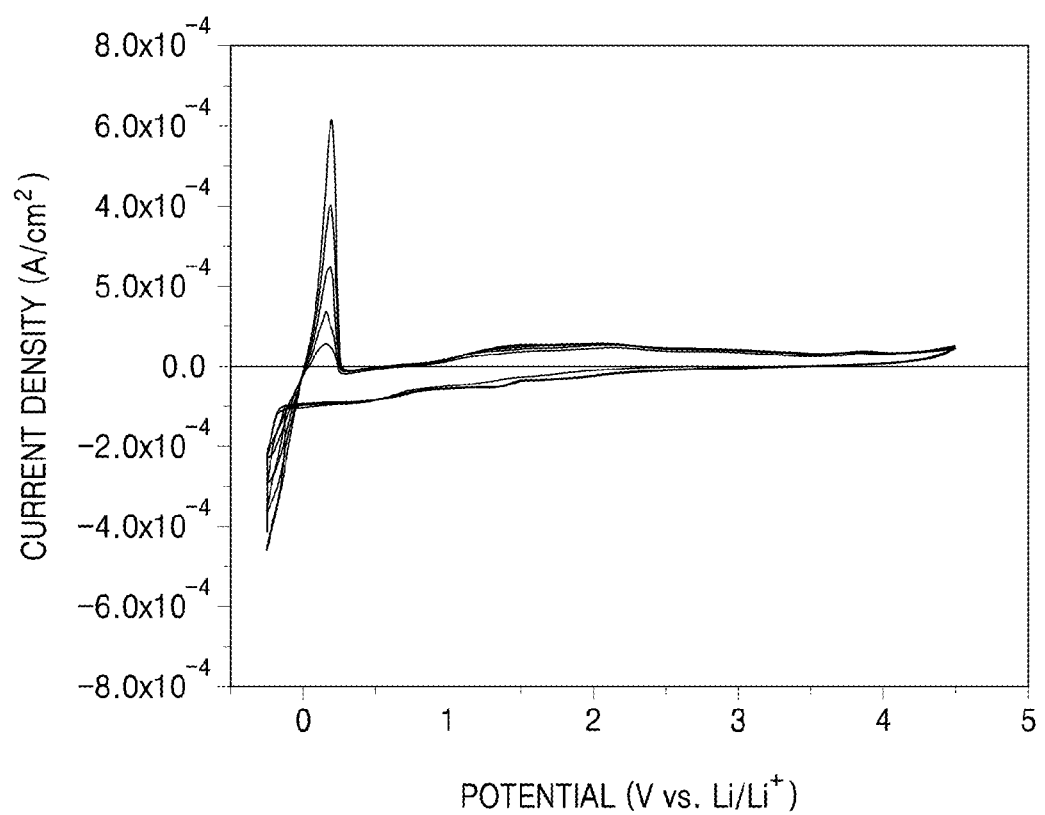
FIGS. 9C and 9D are each a graph of current density (amperes per square centimeter, A/cm²) versus potential (volts versus Li/Li$^+$) which shows cyclic voltammetry results for a lithium metal battery manufactured according to Example 15.
Figure 9D:
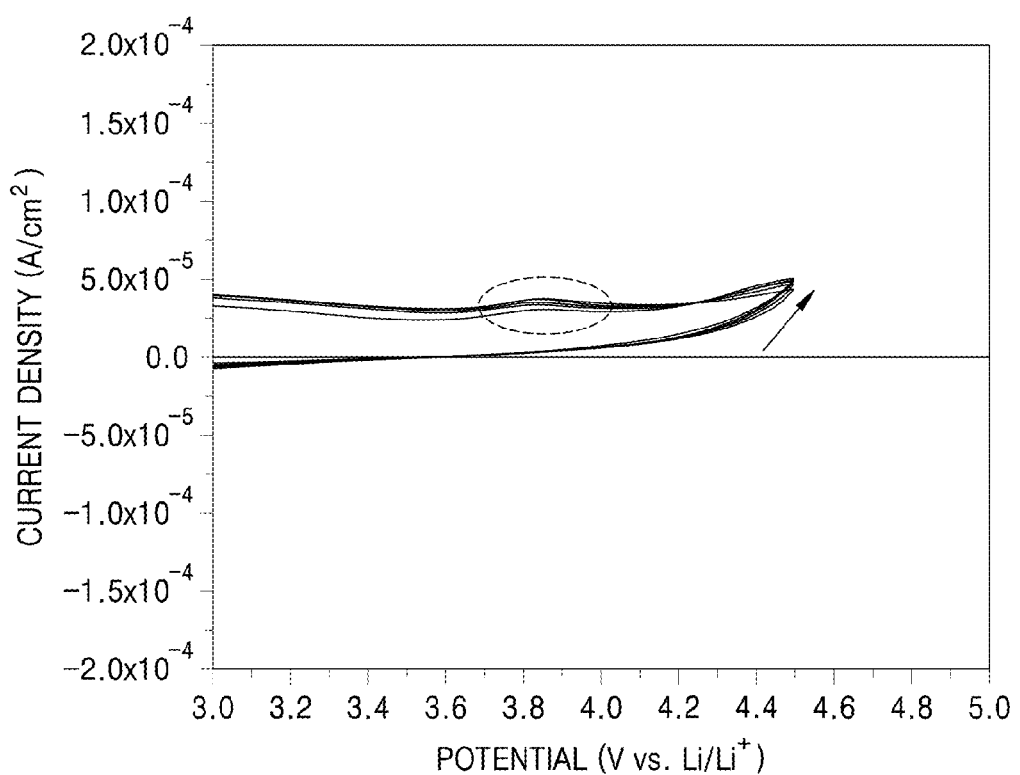
Figure 9E:
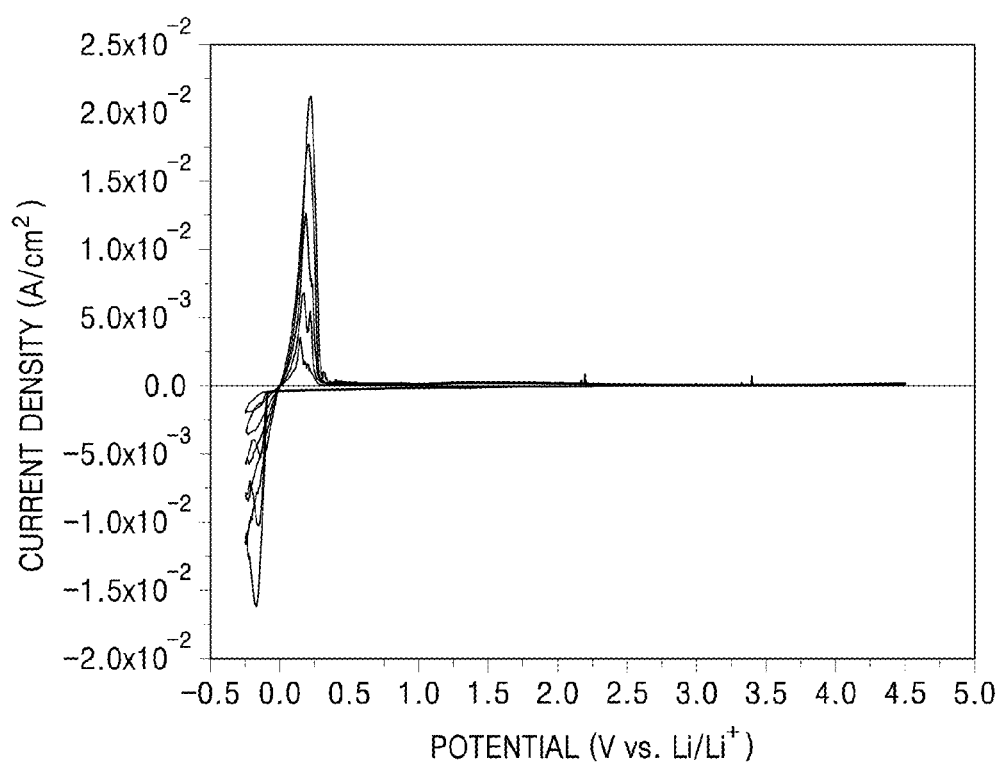
FIGS. 9E and 9F are each a graph of current density (amperes per square centimeter, A/cm$^2$) versus potential (volts versus Li/Li$^+$) which shows cyclic voltammetry results for a lithium metal battery manufactured according to Comparative Example 9.
Figure 9F:
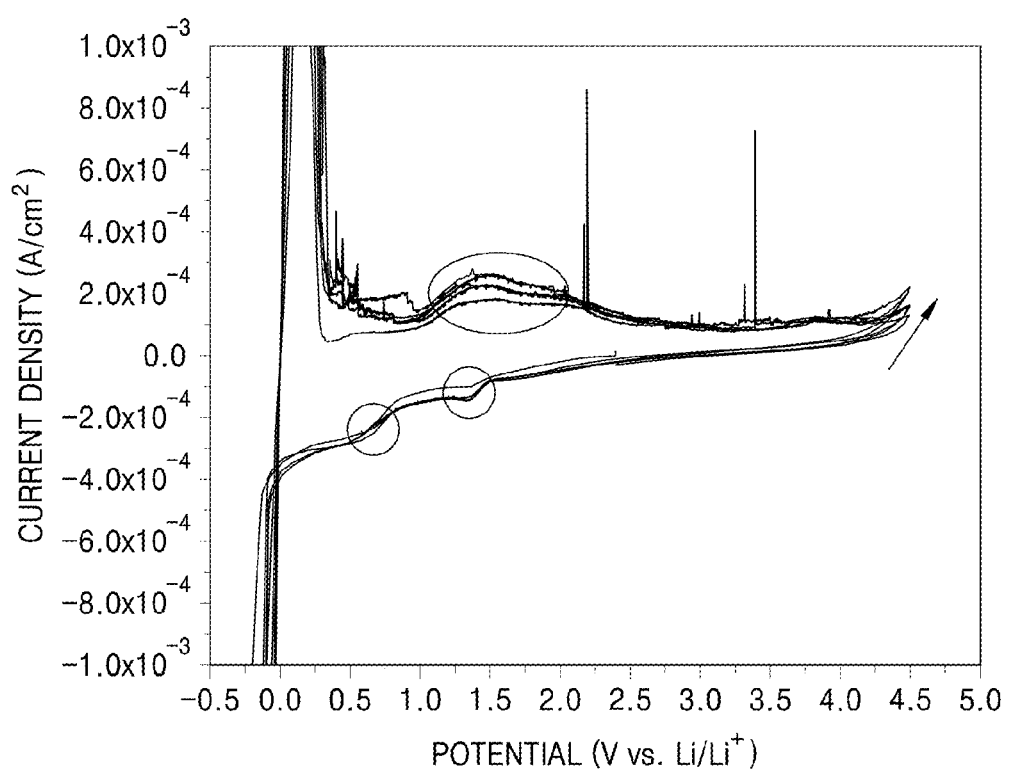

Analysis of the lithium metal batteries manufactured in Example 15 and Comparative Examples 9 and 10 was performed according to the same method as cyclic voltammetry. FIGS. 9C and 9D represent cyclic voltammetry analysis results on the lithium metal battery manufactured according to Example 15, and FIGS. 9E and 9F represent cyclic voltammetry analysis results on the lithium metal battery manufactured according to Comparative Example 9.

Referring to FIGS. 9C and 9D, the lithium metal battery manufactured according to Example 15 was excellent in electrochemical stability. On the contrary, cathodic and anodic peaks resulting from side reactions as shown in FIGS. 9E and 9F were observed in the lithium metal battery manufactured according to Comparative Example 9, and it could be seen from the cathodic and anodic peaks that electrochemical stability of the lithium metal battery was lowered. Further, the lithium metal battery manufactured according to Comparative Example 10 represented cyclic voltammetry characteristics similar to those of the lithium metal battery manufactured according to Comparative Example 9.

Evaluation Example 5: Charge Characteristics

Constant current charging processes of the lithium metal batteries manufactured in Example 10 and Comparative Examples 7 were performed to a current of about 0.1 C rate at about 25° C. until a voltage reached about 4.30 V (vs. Li), and then the lithium metal batteries passing through the constant current charging processes were cutoff at a current of about 0.05 C rate while maintaining the voltage of about 4.30 V in a constant voltage mode. Subsequently, the cutoff lithium metal batteries were discharged to a constant current of about 0.1 C rate until the voltage reached about 2.80 V (vs. Li) during discharging (the first cycle in the chemical conversion step). Such charging and discharging processes were performed two cycles more to complete the chemical conversion process.

After constant current charging processes of the lithium metal batteries passing through the chemical conversion step were performed to a constant current of about 0.5 C rate at about room temperature (25° C.) in a voltage range of about 3.0 V to about 4.4 V, constant current discharging processes of the lithium metal batteries passing through the constant current charging processes were performed to a constant current of about 0.2 C rate by a current of about 0.72 mA until the voltage reached about 4.4 V of a cutoff voltage.

Figure 11:
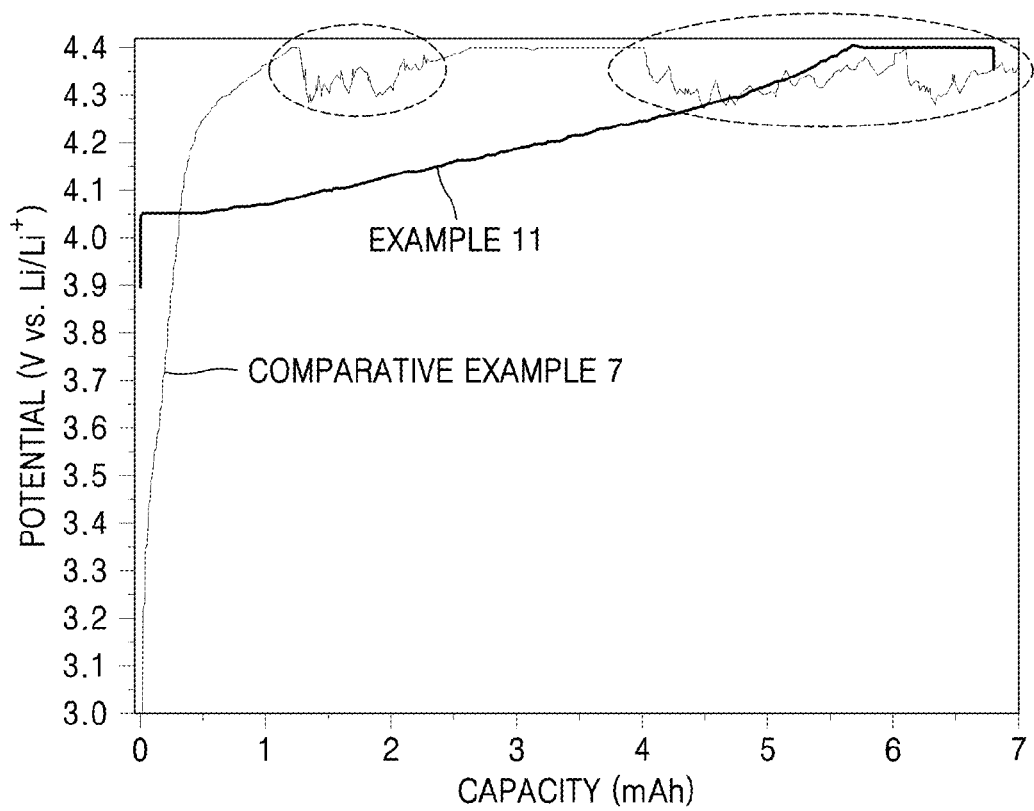
FIG. 11 is a graph of potential (volts versus Li/Li$^+$) versus capacity (milliampere hours, mAh) which shows potential changes according to capacities of lithium metal batteries manufactured according to Example 10 and Comparative Example 7.

After examining charge characteristics of the lithium metal batteries manufactured according to Example 10 and Comparative Example 7, the examined charge characteristics of the lithium metal batteries were represented in FIG. 11.

As shown in FIG. 11, a phenomenon in which charging was impossible in the lithium metal battery manufactured according to Comparative Example 7 could be observed. On the contrary, it could be confirmed that the charging process was performed smoothly in the lithium metal battery manufactured according to Example 10 differently from the lithium metal battery manufactured according to Comparative Example 7.

Evaluation Example 6: Scanning Electron Microscope (SEM) and X-Ray Photoelectron Spectroscopy (XPS) Analyses The lithium metal battery manufactured in Example 10 was charged at a constant current of about 0.1 C rate at about 25° C. until a voltage reached about 4.30 V (vs. Li). The lithium metal battery maintained a constant voltage thereof to 4.30 V was discharged and then the constant voltage was cut-off at a current of 0.05 C rate. Next, the lithium battery was discharged at a constant current of 0.1 C rate until a voltage of the lithium battery was reached 2.8V (vs. Li) (1$^{st}$ cycle in formation process).

Such charging and discharging processes were performed two cycles more to complete the formation process.

The lithium battery subjected to the two cycle in the formation process were charged at a constant current of i) about 0.5 C rate or ii) about 1 C at about room temperature (25° C.) until a voltage of the lithium batteries reached in a voltage range of about 3.0 V to about 4.4 V. The lithium metal battery was discharged at a constant current of about 0.2 C rate by a current of about 0.72 mA until the voltage reached to a cut-off voltage of about 4.4 V.

After repeatedly performing such charging and discharging processes totally 300 cycles on the lithium metal battery, SEM and XPS analyses were performed on material formed on a lithium negative electrode of the lithium metal battery.

Figure 12A:
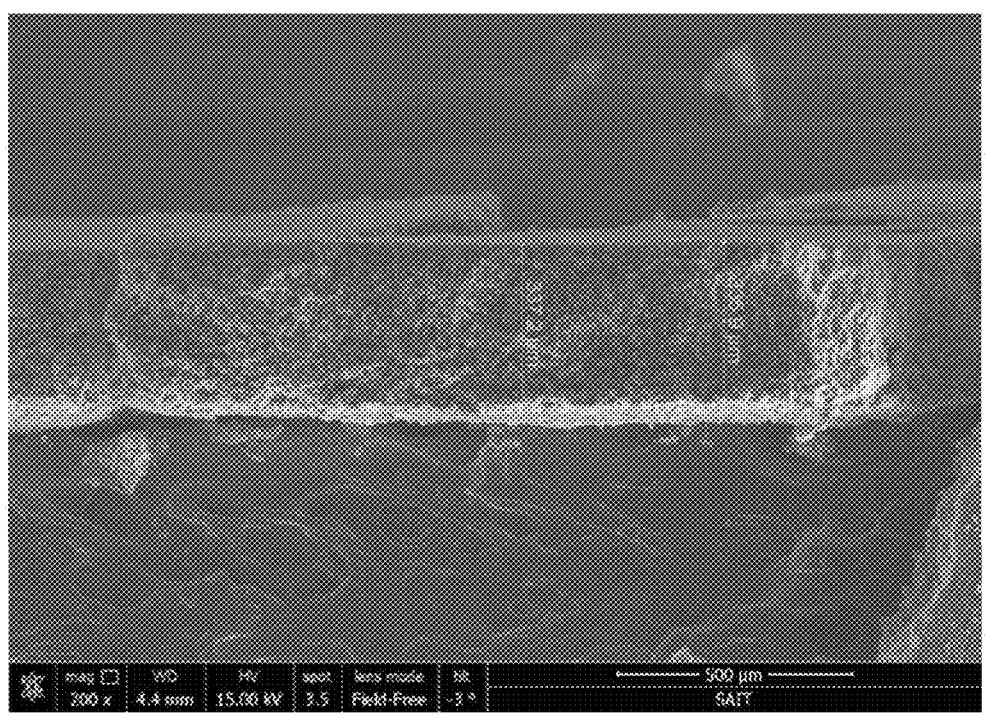
FIGS. 12A and 12B are scanning electron microscope (SEM) images showing lithium negative electrode states after repeatedly performing 300 cyclic charging/discharging processes in a lithium metal battery manufactured according to Example 10.
Figure 12B:
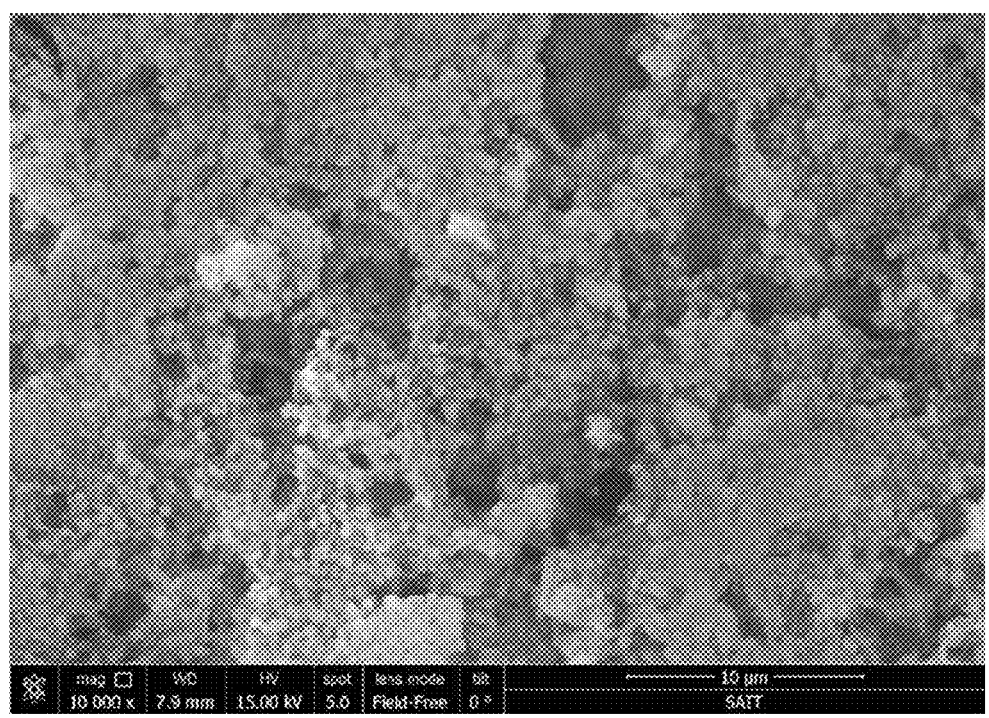

FIGS. 12A and 12B are respectively SEM images showing states of the lithium negative electrode after repeatedly performing 300 cyclic charging/discharging processes in the lithium metal battery manufactured according to Example 10.

Referring to FIG. 12A, the drawing shows a product formed on the lithium negative electrode after performing about 300 cycles of the charging/discharging processes. It could be seen by referring to FIG. 12B that a lithium deposition layer having a jelly bean shaped morphology with a thickness of about 20 μm is formed on the surface of the lithium negative electrode.

XPS analysis results are as represented in the following Table 3.

TABLE 3

| Elements | % by weight | atomic percent (%) |
|---|---|---|
| Carbon (C) | 3.87 | 6.20 |
| Nitrogen (N) | 4.45 | 6.11 |
| Oxygen (O) | 42.65 | 51.22 |
| Fluorine (F) | 17.99 | 18.20 |
| Sulfur (S) | 29.87 | 17.90 |
| Cobalt (Co) | 1.17 | 0.38 |

It could be seen by referring to Table 3 that a decomposition product of an imide based salt as a lithium salt exists on the surface of the lithium negative electrode.

It should be understood that exemplary embodiments described herein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope as defined by the following claims.

What is claimed is:
1. A lithium metal battery comprising:
a negative electrode comprising lithium metal;
a positive electrode; and
an electrolyte interposed between the lithium negative electrode and the positive electrode,
wherein the electrolyte contains
a non-fluorine substituted ether, which is capable of solvating lithium ions,
a fluorine substituted ether represented by Formula 1, and
a lithium salt,
wherein an amount of the fluorine substituted ether represented by Formula 1 is greater than an amount of the non-fluorine substituted ether,

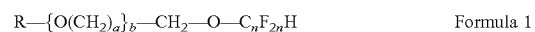

wherein R is —C$_m$F$_{2m}$H or —C$_m$F$_{2m+1}$, n is an integer of 2 or greater, m is an integer of 1 or greater, a is an integer of 1 or 2, and b is 0 or 1, and
wherein a concentration of the lithium salt is from about 3.3 molar to about 7 molar.
2. The lithium metal battery of claim 1, wherein the electrolyte has a viscosity of about 5 centipoise or less.
3. The lithium metal battery of claim 1, wherein a concentration of the lithium salt is in a range of about 5 molar to about 7 molar.
4. The lithium metal battery of claim 1, wherein an amount of the fluorine substituted ether represented by Formula 1 is in a range of about 55% by volume to about 85% by volume, based on a total volume of the non-fluorine substituted ether and the fluorine substituted ether.
5. The lithium metal battery of claim 1, wherein an amount of the non-fluorine substituted ether is in a range of about 15% by volume to about 45% by volume, based on a total volume of the non-fluorine substituted ether and the fluorine substituted ether.
6. The lithium metal battery of claim 1, wherein a concentration of the lithium salt is in a range of about 4 molar to about 6 molar.
7. The lithium metal battery of claim 1, wherein n is an integer of 2 to 5, and m is an integer of 1 to 5.

8. The lithium metal battery of claim 1, wherein R is —$CF_2CF_2H$, —$CF_2CF_2CF_2H$, —$CF_2CF_2CF_2CF_2H$, or —$CF_3$.

9. The lithium metal battery of claim 1, wherein the fluorine substituted ether is of the formula R—$\{O(CH_2)_a\}_b$—$CH_2$—O—$CF_2CF_2H$, R—$\{O(CH_2)_a\}_b$—$CH_2$—O—$CF_2CF_2CF_2H$, or R—$\{O(CH_2)_a\}_b$—$CH_2$—O—$CF_2CF_2CF_2CF_2H$.

10. The lithium metal battery of claim 1, wherein the fluorine substituted ether is a compound represented by Formula 2:

R—$CH_2$—O—$C_nF_{2n}H$    Formula 2 wherein R is —$C_{m+1}H_mF_{2m}$ or —$C_mF_{2m+1}$, n is an integer of 2 to 5, and m is an integer of 1 to 5.

11. The lithium metal battery of claim 1, wherein the fluorine substituted ether represented by Formula 1 is one or more selected from $HCF_2CF_2CH_2OCF_2CF_2H$, $HCF_2CF_2CH_2OCF_2CF_2CF_2CF_2H$, $HCF_2CF_2OCH_2CF_3$, $HCF_2CF_2OCH_2CH_2OCF_2CF_2H$, $HCF_2CF_2OCH_2CH_2OCF_2CF_2H$, $HCF_2CF_2OCH_2CH_2CH_2OCF_2CF_2H$, $HCF_2CF_2CH_2OCF_2CF_2CF_2H$, $HCF_2CF_2OCH_2CH_2OCF_2CF_2CF_2H$, and $HCF_2CF_2OCH_2CH_2CH_2OCF_2CF_2CF_2H$.

12. The lithium metal battery of claim 1, wherein the non-fluorine substituted ether is a glyme solvent.

13. The lithium metal battery of claim 1, wherein the non-fluorine substituted ether is one or more selected from ethyleneglycol dimethylether, ethyleneglycol diethylether, propyleneglycol dimethylether, propyleneglycol diethylether, butyleneglycol dimethylether, butyleneglycol diethylether, diethyleneglycol dimethylether, triethyleneglycol dimethylether, tetraethyleneglycol dimethyl ether, diethyleneglycol diethylether, triethyleneglycol diethylether, tetraethyleneglycol diethylether, dipropyleneglycol dimethylether, tripropyleneglycol dimethylether, tetrapropyleneglycol dimethylether, dipropyleneglycol diethylether, tripropyleneglycol diethylether, tetrapropyleneglycol diethylether, dibutyleneglycol dimethylether, tributyleneglycol dimethylether, tetrabutyleneglycol dimethylether, dibutyleneglycol diethylether, tributyleneglycol diethylether, tetrabutyleneglycol diethylether, poly(ethylene glycol) dilaurate, poly(ethylene glycol) monoacrylate, and poly(ethylene glycol) diacrylate.

14. The lithium metal battery of claim 1, wherein the lithium salt is one or more selected from LiSCN, $LiN(CN)_2$, $LiClO_4$, $LiBF_4$, $LiAsF_6$, $LiPF_6$, $LiCF_3SO_3$, $Li(CF_3SO_2)_2N$, $Li(CF_3SO_2)_3C$, $LiSbF_6$, $LiN(SO_2CF_3)_2$, $Li(FSO_2)_2N$, $LiC_4F_9SO_3$, $LiN(SO_2CF_2CF_3)_2$, $LiSbF_6$, $LiPF_3(CF_2CF_3)_3$, $LiPF_3(C_2F_5)_3$, $LiPF_3(CF_3)_3$, LiCl, LiF, LiBr, LiI, $LiB(C_2O_4)_2$, lithium difluoro(oxalato)borate, and lithium bis(oxalato)borate.

15. The lithium metal battery of claim 1, wherein the lithium salt is a fluorine-containing sulfone and is one or more selected from $LiN(FSO_2)_2$, $LiN(CF_3SO_2)_2$, $LiN(CF_2SO_2)(CF_3CF_2CF_2CF_2SO_2)$, $LiN(CF_3CF_2SO_2)_2$, $LiC(CF_3SO_2)_2$, and $LiC(CF_3CF_2SO_2)_2$.

16. The lithium metal battery of claim 1, wherein a concentration of the lithium salt is from about 5 molar to about 7 molar, and
wherein the electrolyte has a viscosity range of about 5 centipoise or less.

17. The lithium metal battery of claim 1, wherein the electrolyte has an ion conductivity of about 1.0 milliSiemens per centimeter or greater at 25° C.

18. The lithium metal battery of claim 1, wherein the non-fluorine substituted ether is contained in an amount ranging from about 20% by volume to about 40% by volume, based on the total amount of the non-fluorine substituted ether and the fluorine substituted ether.

19. The lithium metal battery of claim 1, wherein the electrolyte comprises ethylene glycol dimethyl ether, one or more selected from $HCF_2CF_2CH_2OCF_2CF_2H$ and $HCF_2CF_2CH_2OCF_2CF_2CF_2CF_2H$, and one or more selected from $LiN(FSO_2)_2$ and $LiN(CF_4SO_2)_2$.

20. The lithium metal battery of claim 1, wherein the electrolyte further comprises one or more selected from ethylene carbonate, propylene carbonate, dimethyl carbonate, diethyl carbonate, butylene carbonate, ethylmethyl carbonate, fluoroethylene carbonate, methylpropyl carbonate, ethylpropyl carbonate, methylisopropyl carbonate, dipropyl carbonate, dibutyl carbonate, gamma butyrolactone, dimethylene glycol dimethyl ether, trimethylene glycol dimethyl ether, tetraethylene glycol dimethyl ether, polyethylene glycol dimethyl ether, succinonitrile, dimethyl sulfone, ethylmethyl sulfone, diethyl sulfone, adiponitrile, 1,1,2,2-tetrafluoroethyl 2,2,3,3-tetrafluoropropyl ether, 2,3,3,4,4,5,5-octafluoropentyl 1,1,2,2-tetrafluoroethyl ether, benzonitrile, acetonitrile, tetrahydrofuran, 2-methyltetrahydrofuran, γ-butyrolactone, dioxolane, 4-methyldioxolane, N,N-dimethylformamide, N,N-dimethylacetamide, dimethyl sulfoxide, dioxane, sulfolane, dichloroethane, chlorobenzene, and nitrobenzene.

21. An electrolyte for a lithium metal battery, the electrolyte comprising:
a non-fluorine substituted ether, which is capable of solvating lithium ions,
a fluorine substituted ether represented by Formula 1, and
a lithium salt,
wherein the amount of the fluorine substituted ether represented by Formula 1 is greater than an amount of the non-fluorine substituted ether, R—$\{O(CH_2)_a\}_b$—$CH_2$—O—$C_nF_{2n}H$    Formula 1 wherein R is —$C_mF_{2m}H$ or —$C_mF_{2m+1}$, n is an integer of 2 or greater, m is an integer of 1 or greater, a is an integer of 1 or 2, and b is 0 or 1 and
wherein a concentration of the lithium salt is from about 3.3 molar to about 7 molar.

22. The electrolyte of claim 21, wherein the amount of the fluorine substituted ether represented by Formula 1 is in an amount of about 55% by volume to about 85% by volume, based on the total volume of the non-fluorine substituted ether and the fluorine substituted ether.

23. The electrolyte of claim 21, wherein the amount of non-fluorine substituted ether is in a range of about 15% by volume to about 45% by volume, based on the total volume of the non-fluorine substituted ether and the fluorine substituted ether.

* * * * *